US012753521B2

(12) United States Patent
Chen et al.

(10) Patent No.: US 12,753,521 B2
(45) Date of Patent: Oct. 6, 2026

(54) ELECTROCATALYSTS FOR $H_2O_2$ PRODUCTION

(71) Applicant: The Regents of the University of California, Oakland, CA (US)

(72) Inventors: Zheng Chen, San Diego, CA (US); Qiaowan Chang, San Diego, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 874 days.

(21) Appl. No.: 17/919,242

(22) PCT Filed: Apr. 15, 2021

(86) PCT No.: PCT/US2021/027494

§ 371 (c)(1),
(2) Date: Oct. 14, 2022

(87) PCT Pub. No.: WO2021/211852

PCT Pub. Date: Oct. 21, 2021

(65) Prior Publication Data

US 2023/0183870 A1 Jun. 15, 2023

Related U.S. Application Data

(60) Provisional application No. 63/010,658, filed on Apr. 15, 2020.

(51) Int. Cl.
*C25B 11/052* (2021.01)
*B01J 35/45* (2024.01)
(Continued)

(52) U.S. Cl.
CPC ............ *C25B 11/052* (2021.01); *B01J 35/45* (2024.01); *C01B 15/01* (2013.01); *C25B 1/30* (2013.01); *C25B 11/065* (2021.01); *C25B 11/081* (2021.01)

(58) Field of Classification Search
CPC ....... C25B 11/052; C25B 1/30; C25B 11/065; C25B 11/081; C25B 11/054; B01J 35/45;
(Continued)

(56) References Cited

U.S. PATENT DOCUMENTS 8,247,136 B2 * 8/2012 Yan .................... H01M 8/1004 427/115
2008/0193819 A1 8/2008 Yoshii et al.
(Continued)

FOREIGN PATENT DOCUMENTS

KR 20160101402 A * 8/2016 .............. G01N 1/40

OTHER PUBLICATIONS

Machine Translation of KR-20160101402-A.*
(Continued)

*Primary Examiner* — Bryan D. Ripa
(74) *Attorney, Agent, or Firm* — Eleanor Musick; Torrey Pines Law Group PC

(57) ABSTRACT

An electrocatalyst for producing hydrogen peroxide solution on-demand via a 2-electron electrochemical oxygen reduction reaction in an acid electrolyte is synthesized from oxygen-functionalized nanostructured carbon and noble metal particles.

19 Claims, 15 Drawing Sheets

(51) Int. Cl.
*C01B 15/01* (2006.01)
*C25B 1/30* (2006.01)
*C25B 11/065* (2021.01)
*C25B 11/081* (2021.01)

(58) Field of Classification Search
CPC . B01J 21/18; B01J 35/33; B01J 21/185; B01J 23/44; C01B 15/01
See application file for complete search history.

(56) References Cited

U.S. PATENT DOCUMENTS

| | | | | |
|---|---|---|---|---|
| 2017/0226647 | A1* | 8/2017 | Benetton | C02F 1/722 |
| 2019/0001306 | A1 | 1/2019 | Takeda et al. | |
| 2019/0105635 | A1* | 4/2019 | Gilliland, III | B01J 35/30 |
| 2019/0186024 | A1* | 6/2019 | Cui | B01J 21/185 |
| 2021/0399312 | A1* | 12/2021 | Huang | H01M 4/921 |

OTHER PUBLICATIONS

"Facile Synthesis of Pd Nanoparticles on Nanocarbon Supports and Their Application as an Electrocatalyst for Oxidation of Ethanol in Alkaline Media: The Effect of Support" by Habibi et al., Int. J. Hydrog. Energy 40, pp. 10833-10846 (2015).*

"Electrocatalytic Oxidation and Detection of Hydrazine at Carbon Nanotube-Supported Palladium Nanoparticles in Strong Acidic Solution Conditions" by Zhao et al., Electrochim. Acta 56, pp. 4930-4936 (2011).*

Borja-Arca, E., Microwave Assisted Synthesis of Osmium Electrocatalysts for the Oxygen Reduction Reaction in the Absence and Presence of Aqueous Methanol, International Journal of Electrochemistry, May 31, 2011, pp. 1-9, vol. 2011.

Chang, Q. et al., Promoting H202 production via 2-electron oxygen reduction by coordinating partially oxidized Pd with defect carbon, Nature Communications, May 1, 2020, 11:2178, pp. 1-9.

Wang, Q., Coordination Engineering Of Iridium Nanocluster Bifunctional Electrocatalyst For Highly Efficient and pH Universal Overall Water Splitting, Nature Communications, 2020, 11:4246; pp. 1-10.

International Search Report and Written Opinion, PCT Appl. No. PCT/US2021/027494, Jul. 9, 2021, 10 pages.

Lu et al., High-efficiency oxygen reduction to hydrogen peroxide catalysed by oxidized carbon materials, Nature Catalysis, Jan. 15, 2018, vol. 1; pp. 156-162.

* cited by examiner

ELECTROCATALYSTS FOR $H_2O_2$ PRODUCTION

RELATED APPLICATIONS

This application is a 371 national stage filing of International Application No. PCT/US2021/027494, filed Apr. 15, 2021, which claims the benefit of the priority of U.S. Application No. 63/010,658, filed Apr. 15, 2020, each of which is incorporated herein by reference in its entirety.

FIELD OF THE INVENTION

The present invention relates to compositions and methods for producing hydrogen peroxide ($H_2O_2$) solution on-site via a two-electron electrochemical oxygen reduction reaction, including oxidized carbon nanotubes and metal-deposited/supported oxidized carbon nanotubes.

BACKGROUND

Hydrogen peroxide ($H_2O_2$) is an important chemical that is widely used in fiber and paper production, chemical synthesis, wastewater treatment, and the mining industry. It has also recently been identified as effective, in vapor form, for decontaminating N95 face masks for reuse, a critical capability for addressing PPE shortages that have occurred in healthcare facilities during the SARS-CoV-2 pandemic.

In practice, dilute $H_2O_2$ solution suffices for most applications (e.g., <0.1 wt. % $H_2O_2$ aqueous solution is used for water treatment). While highly desirable given its wide-ranging usefulness, a significant challenge exists due to the solution's poor shelf life. $H_2O_2$ begins to break down into water and oxygen even before the container is opened. It breaks down even more quickly when exposed to air or light. Furthermore, the chemical instability of $H_2O_2$ poses safety issues for transportation and storage. On-site production of $H_2O_2$ is key to exploiting its full potential, yet establishment of such facilities would be expensive and impractical for hospitals and other healthcare facilities. Today's anthraquinone oxidation-based industrial production of $H_2O_2$ needs to be improved to significantly reduce energy consumption and organic waste generation. To enable on-demand, decentralized production of $H_2O_2$ using renewable electricity, electrochemical $H_2O_2$ synthesis through a selective 2-electron ($2e^-$) oxygen reduction reaction (ORR) pathway represents a promising alternative route. The key to realize this process on a large scale is to develop efficient and economically viable electrocatalysts with high selectivity and activity.

In alkaline and neutral electrolytes, defective carbon materials, such as oxidized carbon nanotubes (O—CNT), B—N-doped carbon, Fe single-atom coordinated O—CNT and reduced graphene oxide (GO), have shown high activity and selectivity for the $2e^-$ ORR. For example, mildly reduced GO exhibits nearly 100% selectivity and stable activity at low overpotential (<10 mV) in 0.1M KOH. It is particularly interesting to find that the selectivity of carbon materials could also be enhanced by the introduction of boron nitride (BN) islands where the active sites were attributed to the interface between hexagonal BN and graphene. While these catalysts are efficient in alkaline conditions, producing $H_2O_2$ under acidic conditions shows technological advantage in fuel cell operation as today's proton conducting polymeric membranes are far more technologically mature than their hydroxide-conducting counterparts. In addition, acidic $H_2O_2$ solution can be directly used as an oxidant for chemical synthesis, which contributes more than 33% to the global market share of $H_2O_2$. Due to the weak acidic nature of the $H_2O_2$ molecule, storing $H_2O_2$ in an acidic environment can also offer a longer shelf-life compared to alkaline conditions. However, carbon-based materials require a large overpotential (~300 mV) to initiate the ORR reaction in acidic electrolytes, resulting in significant voltage loss in fuel cell operations. For instance, the onset potential of high-selectivity mesoporous N-doped carbon was up to ~0.5 V in 0.1 M $HClO_4$, leading to a possible potential loss of 200 mV in the ORR test.

Precious metals and alloys have long been investigated as electrocatalysts for $2e^-$ ORR in the acidic environment, including Au, Pt, Pd—Au, Pt—Hg, Ag—Hg and Pd—Hg. So far, Pd—Hg core-shell nanoparticles represent the most active catalysts in the acidic environment. Benefiting from its optimal hydroperoxide radical (HOO*) binding energy, core-shell Pd—Hg has been reported to show five times higher mass activity (~130 A $g^{-1}$) than polycrystalline Pt—Hg/C (~25 A $g^{-1}$) (0.65 V versus reversible hydrogen electrode or RHE, all the potential values are refereed to RHE unless specified) with selectivity up to 95% between 0.35 and 0.55 V. However, the high toxicity of Hg might hinder its industrial application. Fe—N—C and Co—N—C are considered as more cost-effective catalysts, but their selectivity needs to be significantly improved.

SUMMARY

Electrochemical synthesis of $H_2O_2$ through a selective two-electron ($2e^{-1}$) oxygen reduction reaction (ORR) is an attractive alternative to the industrial anthraquinone oxidation method for many reasons, including the important benefit of allowing decentralized $H_2O_2$ production. According to the present invention, an electrocatalyst synthesized from a noble metal ("NM") (e.g., Pt, Pd, Rh, Ru, Ir, Au, Os, Ag, etc., and alloys thereof) and oxygen-functionalized carbon is highly effective in producing hydrogen peroxide in an acidic electrolyte via 2e– ORR, allowing for $H_2O_2$ production on demand at a variety of scales ranging from small table-top assemblies and up. In an exemplary embodiment, the synergistic interaction between partially oxidized palladium ($Pd^{\delta+}$) and oxygen-functionalized carbon, promotes highly selected $2e^-$ ORR in acidic electrolytes. An electrocatalyst synthesized by solution deposition of amorphous $Pd^{\delta+}$ clusters ($Pd_3^{\delta+}$ and $Pd_4^{\delta+}$) onto mildly oxidized carbon nanotubes ($Pd^{\delta+}$—OCNT) shows nearly 100% selectivity toward $H_2O_2$, and a positive shift of ORR onset potential by ~320 mV compared to the OCNT substrate. A high mass activity (1.946 A $mg^{-1}$ at 0.45 V) of $Pd^{\delta+}$—OCNT is achieved. Extended X-ray absorption fine structure characterization and density functional theory calculations suggest that the interaction between Pd clusters and the nearby oxygen-containing functional groups is key for the high selectivity and activity for $2e^-$ ORR.

In an exemplary embodiment, the inventive process utilizes direct metal-oxygen coordination to create unique active sites that enable efficient and a more practical electrocatalyst for the $2e^-$ ORR in acidic electrolytes. Specifically, a class of catalysts containing NM-O—C type coordination is disclosed herein, and their effectiveness demonstrated via synthesis by depositing $Pd^{\delta+}$ clusters (3~4 atoms average) onto mildly oxidized CNTs (named as $Pd^{\delta+}$—OCNT in the following context) via a simple solution-impregnation method. Such electrocatalysts show a high $H_2O_2$ selectivity of 95%-98% in a wide potential range of 0.3-0.7 V. The onset potential of $Pd^{\delta+}$—OCNT for the $2e^-$ ORR is positively shifted by ~320 mV compared with the OCNT substrate. The mass activity of $Pd^{\delta+}$—OCNT (i.e., 1.946 A $mg^{-1}$ at 0.45 V) even surpasses that of the core-shell $Pd_2Hg_5$/C by 50%, representing the best reported electrocatalysts for $H_2O_2$ synthesis in acidic electrolytes. Density functional theory (DFT) calculations suggest that the coordination between partially oxidized Pd cluster and OCNT is the key for the enhanced performance of $H_2O_2$ production. Combined with extended X-ray absorption fine structure (EXAFS) characterization, the stable active sites in Pd clusters are identified to be $Pd_3$ and $Pd_4$, with Pd being in the bonding environment of both Pd—Pd and Pd—O. The activity of oxygen-modified $Pd_3$ and $Pd_4$ is further enhanced by a nearby epoxy functional groups, placing the $Pd^{\delta+}$—OCNT catalyst at the peak of the activity volcano with zero overpotential.

The inventive composition and process provide the ability to directly produce $H_2O_2$ in solution with different concentrations on-site to satisfy a variety of industrial applications, which include, inter alia, chemical synthesis, battery recycling, agriculture, paper production, and wastewater treatment.

In one aspect of the invention, an oxidation reduction catalyst for producing hydrogen peroxide is formed from a carbon substrate having oxidation defects therein and noble metal clusters trapped within the oxidation defects, wherein a composition of the noble metal clusters and the carbon substrate induce a selective 2-electron oxygen reduction reaction in an acidic electrolyte. In some embodiments, the carbon substrate may be nanostructured carbon such as carbon nanotubes, carbon black or graphene. The oxidation defects may be induced by exposing the carbon substrate to $HNO_3$ for a predetermined time, which, in a particularly preferred embodiment is 6.5 hours. In some embodiments, the oxidation defects may comprise C—C, C—O, C═O functional groups. In some embodiments, the noble metal clusters may be partially oxidized, and may be $Pd_3$ or $Pd_4$. In some embodiments, the acidic electrolyte is $HClO_4$, $HNO_3$, or $H_2SO_4$.

The catalyst may be formed by suspending carbon nanotubes and $PdCl_2$ in nitric acid solution; heating and stirring the suspension until a dried sample is obtained; and annealing the dried sample.

An assembly for producing hydrogen peroxide may include a container for retaining an acidic electrolyte solution and a catalyst formed from a carbon substrate having oxidation defects therein and noble metal clusters trapped within the oxidation defects, and a pair of electrodes disposed within the solution for generating a potential within the solution. In some embodiments, the noble metal clusters are palladium.

In another aspect of the invention, a composition includes an oxygen-functionalized carbon substrate having oxidation defects induced therein and noble metal clusters trapped within the oxidation defects; wherein the composition induces a selective 2-electron oxygen reduction reaction in an acidic electrolyte to produce hydrogen peroxide. The oxidation defects may be C—C, C—O, C═O functional groups. In some embodiments, the noble metal clusters may be palladium comprising $Pd_3$ or $Pd_4$. The noble metal may be partially oxidized. The acidic electrolyte may be $HClO_4$, $HNO_3$, or $H_2SO_4$.

In another aspect of the invention, a method for producing hydrogen peroxide, includes providing an acid electrolyte solution in a container; disposing a pair of electrodes in the solution; adding an electrocatalyst to the solution, the electrocatalyst comprising a carbon substrate having oxidation defects therein and noble metal clusters trapped within the oxidation defects; stirring the solution; and applying a voltage to the pair of electrodes to generate a potential within the solution, wherein the electrocatalyst induces a selective 2-electron oxygen reduction reaction within the solution to produce hydrogen peroxide. In some embodiments, the carbon substrate is nanostructured carbon and may be carbon nanotubes, carbon black or graphene. In some embodiments, the noble metal clusters may be partially oxidized and may be $Pd_3$ or $Pd_4$. In some embodiments, the acidic electrolyte is $HClO_4$, $HNO_3$, or $H_2SO_4$.

BRIEF DESCRIPTION OF THE DRAWINGS

FIG. 1B plots ratios of Raman intensity for D and G bands ($I_D/I_G$); FIG. 1C plots calculated surface area and average pore diameter from N2 adsorption-desorption isotherms; FIG. 1D plots the recorded mass loss percentages during preparation; FIG. 1E shows the calculated relative ratios of C—O groups and the capacitance of redox peaks from CV; and FIG. 1F provides a summary of the relationship between the ratios of defects, C—O groups, and selectivity toward 2e− ORR.

FIG. 2A and FIG. 2B are HRTEM and annular dark-field (ADF)-STEM images, respectively, of $Pd^{\delta+}$—OCNT; FIG. 2C is an EDS element mapping of H—Pd—OCNT; FIG. 2D provides powder XRD patterns of 6.5 h OCNT, $Pd^{\delta+}$—OCNT and H—Pd—OCNT; FIG. 2E and FIG. 2F plot Fourier transform EXAFS analysis of Pd K-edge data for $Pd^{\delta+}$—OCNT and H—Pd—OCNT, respectively.

FIG. 3C compares the distribution of carbon element in different coordination environments for 6.5 h OCNT, $Pd^{\delta+}$—OCNT and H—Pd—OCNT measured by C1s XPS.

FIG. 4A shows CV curves of different electrocatalysts showing distinct H adsorption/desorption characteristics at a scan rate of 50 mV $s^{-1}$; FIG. 4B shows RRDE voltammograms in $O_2$-saturated $HClO_4$ electrolyte; FIG. 4C compares mass activity of various prior art electrocatalysts against the inventive electrocatalyst for $H_2O_2$ production in the acid electrolyte.

FIG. 5B plots the stability test of $Pd^{\delta+}$—OCNT in a $O_2$-saturated 0.1 M $HClO_4$ at 0.1 V.; FIG. 5C and FIG. 5D are the ADF-STEM image and EDS element mapping, respectively, of $Pd^{\delta+}$—OCNT after stability testing.

DETAILED DESCRIPTION OF EMBODIMENTS OF THE INVENTION

According to the present invention, an electrocatalyst synthesized from a noble metal ("NM") (e.g., Pt, Pd, Rh, Ru, Ir, Au, Os, Ag, etc., and alloys thereof) and oxygen-functionalized carbon is highly effective in producing hydrogen peroxide in an acidic electrolyte via $2e^-$ ORR. Generally, the carbon substrate will be nanostructured carbon such as carbon nanotubes, carbon black, or graphene. Due to their superior selectivity and activity demonstrated in alkaline electrolytes, oxidized carbon nanotubes (OCNTs) were chosen as the substrate to evaluate potential active sites of defect carbons for acidic $H_2O_2$ synthesis. As the oxygen reduction reaction (ORR) overpotential was considered too high in acidic electrolytes, we focused on optimizing the effect of compositional and structural defects on their $2e^-$ ORR selectivity with the aim to create a functional support that can be used to integrate a second motif to improve the overall $2e^-$ ORR activity.

The following description of exemplary embodiments of the inventive electrocatalyst focuses on a composition of carbon nanotubes and palladium (Pd). As will be recognized by those of skill in the art, noble metals (NMs) are generally well known for their catalytic properties and associated capacity to facilitate or control the rates of chemical reactions. Accordingly, the materials and procedures disclosed herein will be readily adaptable for use with other noble metals, including ruthenium (Ru), rhodium (Rh), osmium (Os), iridium (Ir), platinum (Pt), gold (Au), silver (Ag), and the invention is not intended to be limited solely to palladium. Additionally, acidic electrolytes are well-known in the art. Thus, while the embodiments and examples herein describe the use of $HClO_4$, in the production of $H_2O_2$, other acid electrolytes, including, but not limited to $HNO_3$, or $H_2SO_4$, may be used.

Oxidized carbon nanotubes (O—CNTs) were prepared with different density of defects and functional groups, 250 mg of multi-walled CNTs (produced by a tons-scale fluidized chemical vapor deposition process) by refluxing in 20 ml of $HNO_3$ (Fisher Scientific, 68 wt. %) for 2.5 h, 4.5 h, 6.5 h or 8.5 h at 140° C. The resulting product was obtained after centrifugal separation and drying at 55° C. A simple impregnation method was used to prepare Pd supported by OCNTs ($Pd^{\delta+}$—OCNT). Specifically, 2.5 mg of $PdCl_2$ (Alfa Aesar, 99.9%) and 50 mg of OCNT were suspended in 20 ml of 7 wt. % $HNO_3$ solution and heated at 65° C. with vigorous stirring until the mixture was fully dried. To anneal the $Pd^{\delta+}$—OCNT, the as-prepared sample was heated from room temperature to 100° C. at a rate of 10° C. $min^{-1}$ and kept at 100° C. for 1 h under argon (Ar) protection before ramping to 450° C. at a rate of 4° C. min-. Then it was annealed for 5 h at this temperature to obtain thermally annealed sample (H—Pd—OCNT).

Figure 1A:
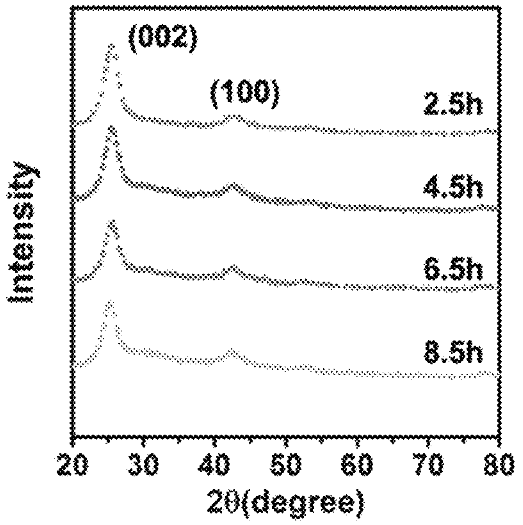
FIGS. 1A-1F provide results of evaluation of OCNT samples with different oxidation times ranging from 2.5 h to 8.5 h, where FIG. 1A plots the XRD patterns.
Figure 1B:
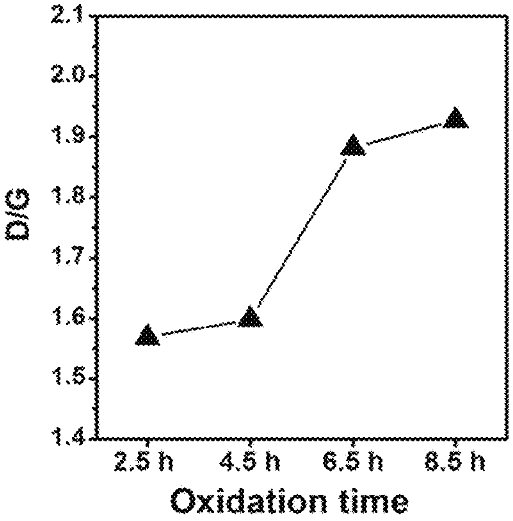
Figure 1C:
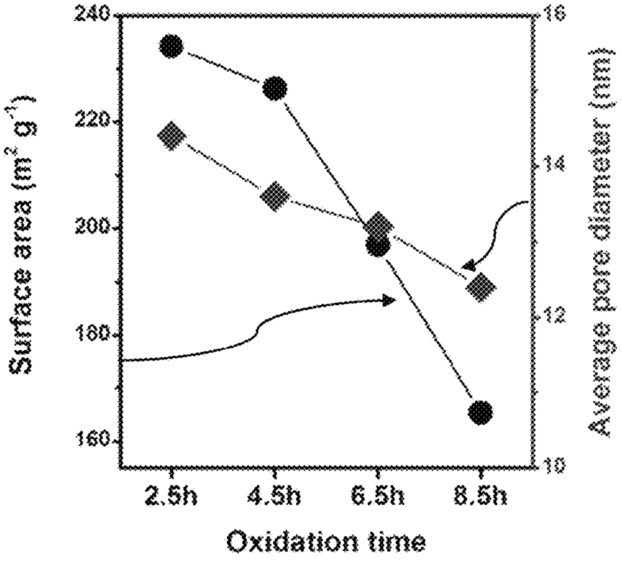
Figure 1D:
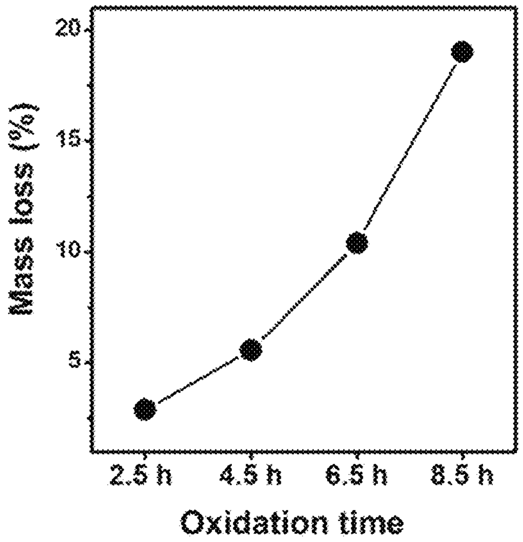

Transmission electron microscopic (TEM) analysis indicated that the density of defect sites increased with longer oxidation time. When reacted for 6.5 h, abundant defect sites were clearly observed from the changes of the surface roughness and curvature at the OCNTs, suggesting that the bended regions of CNTs were more easily oxidized due to the higher strain than the straight tube walls. After 8.5 h of oxidation, thinner OCNTs with smooth surfaces were observed, which was likely due to the complete etching of the outer-walls of OCNT. Under all the explored oxidation conditions, tubular nanostructure and crystallinity were maintained as suggested by both TEM and X-ray diffraction (XRD). The results of XRD analysis are shown in FIG. 1A. The defect formation process was also confirmed by the increased intensity ratios of their D and G bands ($I_D/I_G$) in the Raman spectra (FIG. 1B), changes of surface area (FIG. 1C) and the mass loss of the CNTs (FIG. 1D). Further, the strong signal from the D'band implied the existence of basal plane $sp^2$ carbon oxidization sites in the OCNT.

The oxidation process also introduced defects and functional groups on the surface of OCNTs. Fourier-transform infrared spectroscopy (FTIR) measurements not only confirmed the existence of defects (—$CH_3$) in the samples, but also revealed that the functional groups were mainly C—O and C═O, which were further quantified by X-ray photoelectron spectroscopy (XPS). With increased oxidation time from 2.5 to 6.5 h, the percentages of C═C ($sp^2$ carbon) decreased rapidly while the C—O group as the major component of oxygen-containing functional groups increased from 20.1% to 34.6% (on the C basis). Further extending the oxidation time to 8.5 h led to negligible change of C═C groups but a decrease of C—O ratio by ~5%. At the same time, the density of the C—C (structure defects with the form of $sp^3$ carbon) group increased from 4.9% to 11.1% while that of the C═O groups remained at ~5% during the entire oxidation time.

To correlate the defect characteristics with electrochemical properties, the OCNTs were examined in 0.1M $HClO_4$ by cyclic voltammetry (CV), rotating disk electrode (RDE) and rotating ring disk electrode (RRDE). The CV results indicated that the pseudocapacitive current of the OCNT electrodes first increased as the oxidation time extended from 2.5 to 6.5 h and then maintained roughly the same from 6.5 to 8.5 h. The trend of capacitance changes from the redox current was similar with that of the relatively ratios of the C—O groups on the surface from the XPS results (FIG. 1E), suggesting that redox peaks could be attributed to the oxidation/reduction of surface quinoidal functional group. All the OCNTs presented a similar onset potential (~0.38 V) to initiate the $2e^-$ ORR. From both the RDE and RRDE tests, OCNTs obtained after 6.5 h oxidation presented the highest $H_2O_2$ selectivity among all the OCNTs, with 95% at 0.1 V through the Koutecky-Levich (K-L) calculation and 90%-92% in the range of 0.25 V to 0.35 V from the RRDE measurement. Higher oxygen content in OCNTs has been shown to result in a higher selectivity for $H_2O_2$ in the alkaline medium. In the acidic electrolyte, we found that both the defects and oxygen-containing groups played important roles in determining the $2e^-$ ORR selectivity (FIG. 1F). For example, when the defect ratio (calculated from deconvoluted C1s XPS peak) increased from 9.7% (6.5 h-OCNT) to 11.1% (8.5 h-OCNT) with a similar number of C—O groups, the $H_2O_2$ selectivity decreased from 90% to 78% at 0.25 V. This result indicated that the defect sites might present strong binding with OH* and O*, leading to more preferred $4e^-$ ORR competing process to produce $H_2O$.

Figure 2A:
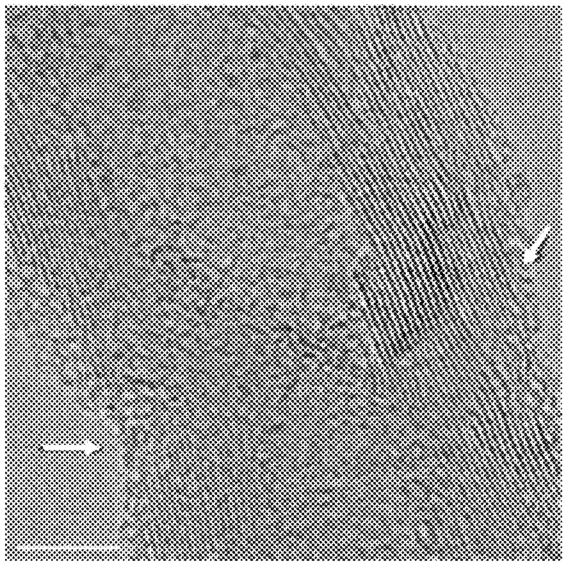
FIGS. 2A-2F illustrate the structural characterization of $Pd^{\delta+}$—OCNT and H—Pd—OCNT electrocatalysts, where
Figure 2B:
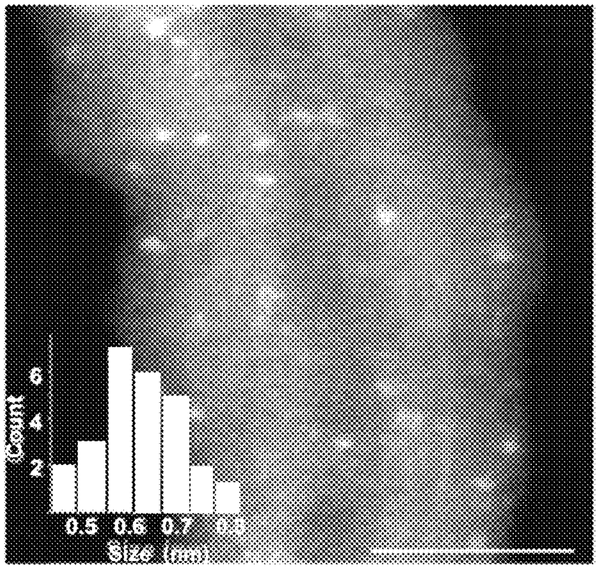
Figure 10:
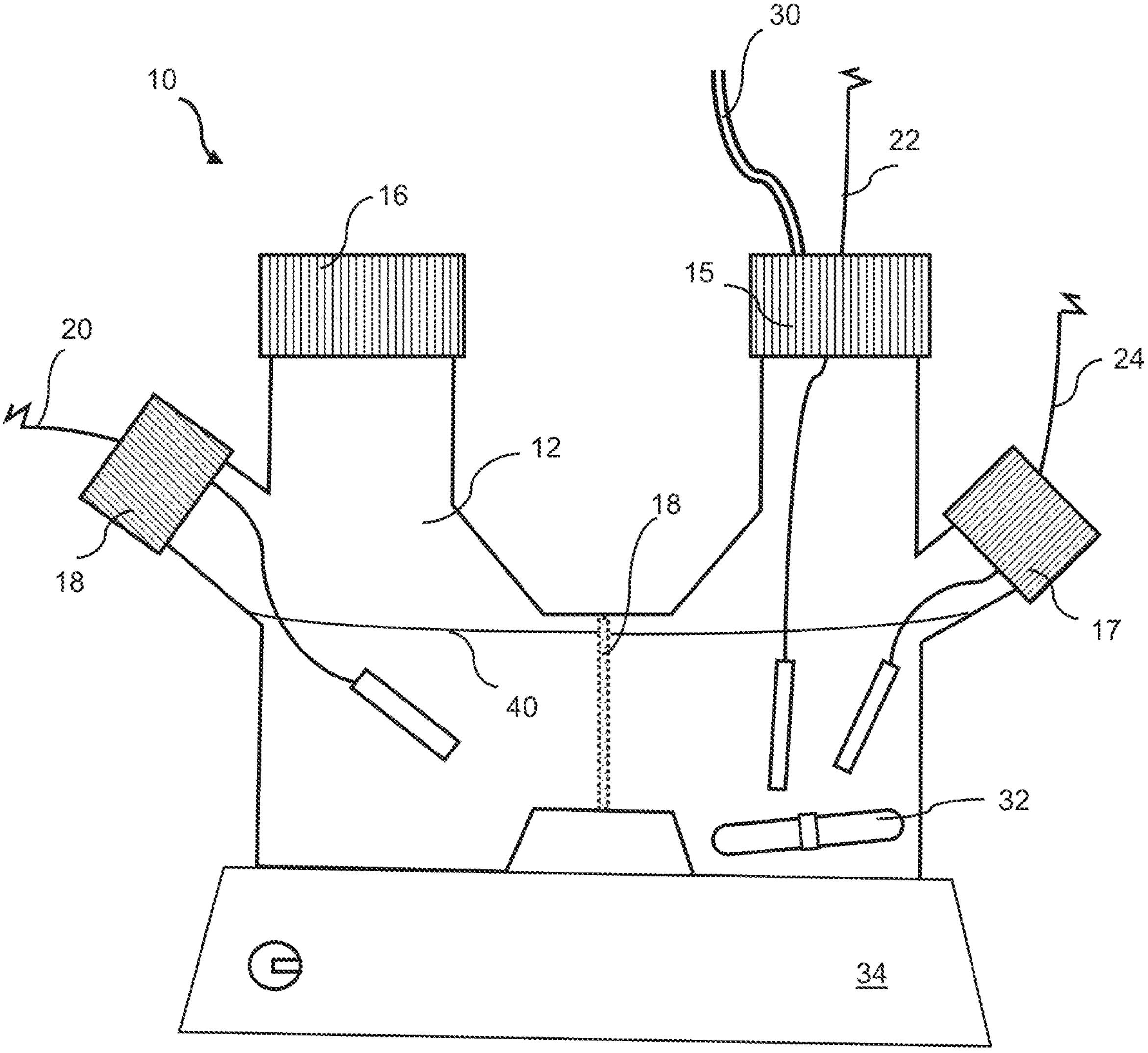
FIG. 10 is a diagram of an exemplary set-up for producing $H_2O_2$ according to an embodiment of the present invention.

Based on results of the preceding evaluation, OCNTs with 6.5 h oxidation were selected as the preferred substrate. $Pd^{\delta+}$—OCNT electrocatalysts composed of Pd clusters ($Pd_3$ and $Pd_4$) supported on OCNTs were prepared by loading ~1.0 wt. % of Pd on OCNTs with 6.5 h oxidation. After Pd deposition, Pd clusters were obtained since no crystalline Pd lattice was detected in the high-resolution TEM (HRTEM) image. FIG. 2A and FIG. 2B are HRTEM and annular dark-field (ADF)-STEM images, respectively, of $Pd^{\delta+}$—OCNT showing uniform distribution of amorphous Pd atom clusters after 6.5 h. (Scale bars: FIG. 2A, 5 nm; FIG. 2B, 10 nm). The inset in FIG. 2B shows the size distribution of the Pd clusters.

Figure 2C:
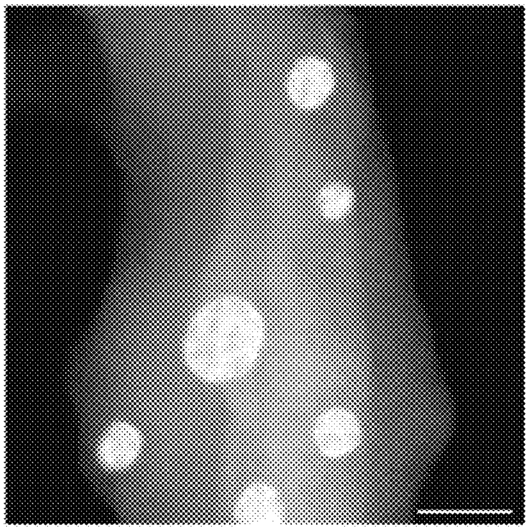
Figure 2D:
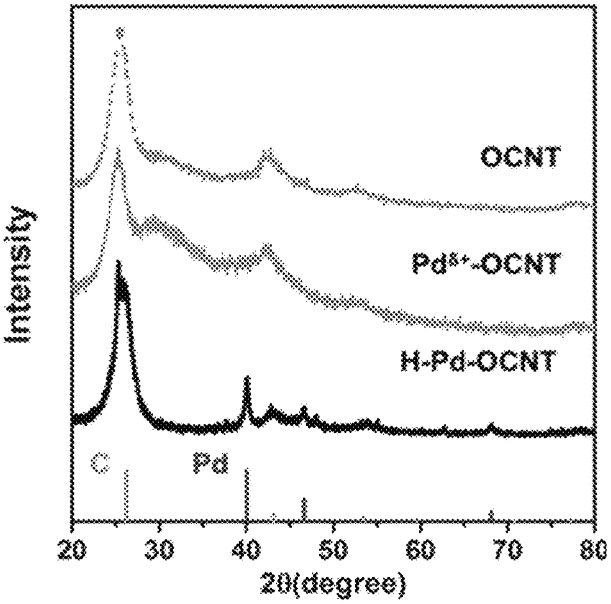
Figure 2E:
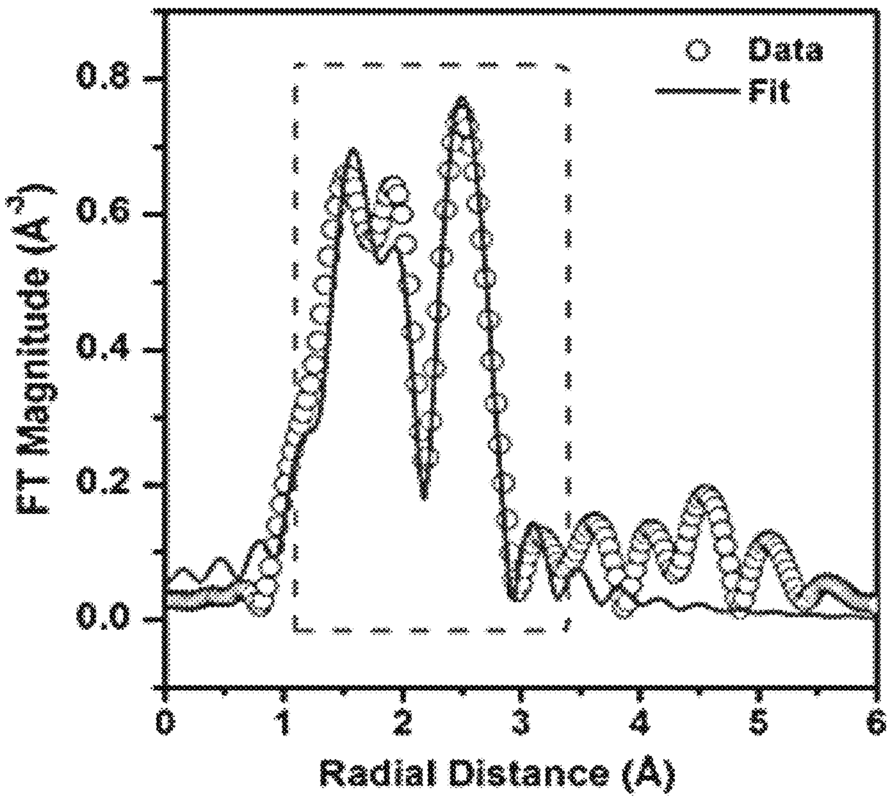
Figure 2F:
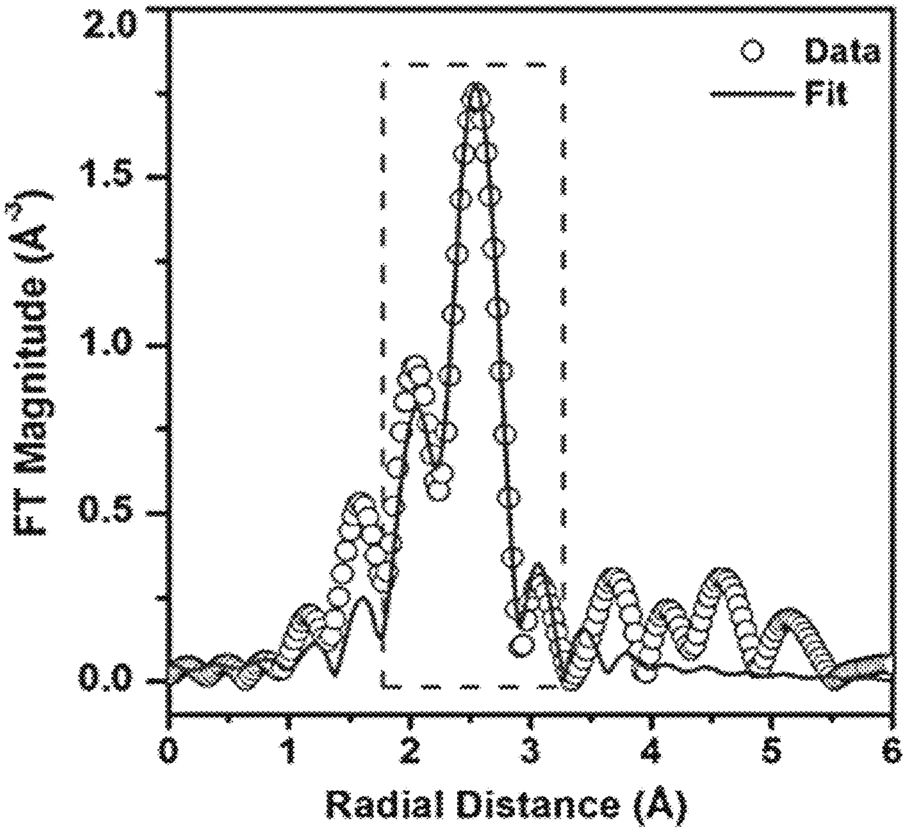

The Pd clusters were distributed uniformly with a narrow size range of 0.61±0.07 nm on OCNTs FIG. 2B. However, with mild thermal annealing (450° C. for 5 h) (sample named as H—Pd—OCNT), aggregated crystalline Pd nanoparticles of 3~10 nm were formed, as shown in FIG. 2C (scale bar: 10 nm). XRD patterns clearly show the amorphous nature of the as-deposited Pd in the $Pd^{\delta+}$—OCNT and high crystallinity of Pd in the H—Pd—OCNT sample (FIG. 2D).

Figure 1E:
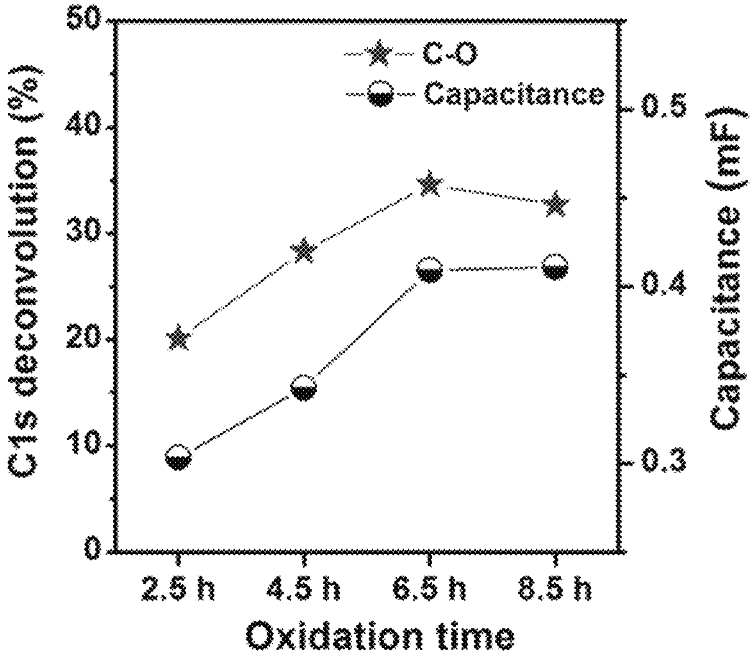
Figure 1F:
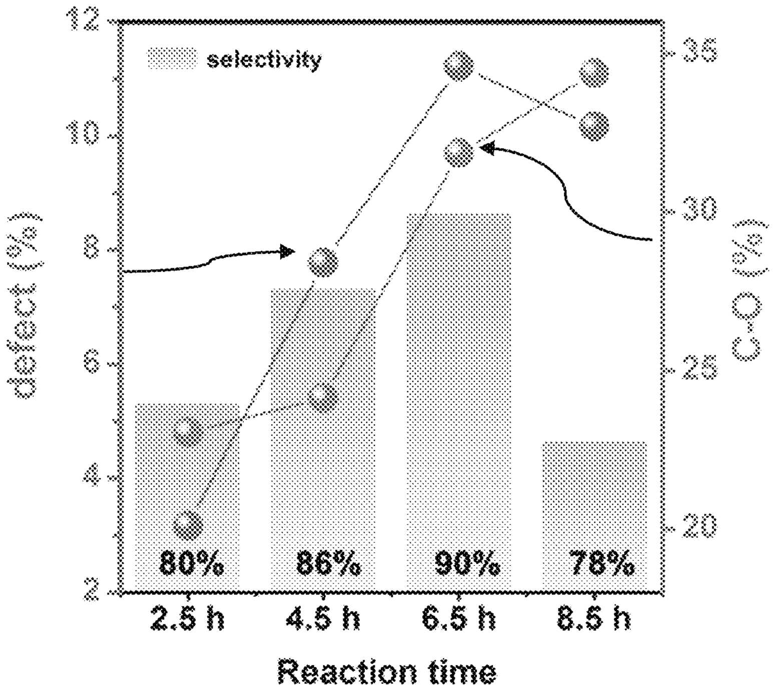

The binding environments of $Pd^{\delta+}$—OCNT and H—Pd—OCNT were further characterized using extended X-ray absorption fine structure (EXAFS), shown in FIGS. 1E, IF, respectively. Tables 1 below provide the EXAFS fitting results, while Tables 2-4 provide the fitting parameters of Pd metal, H—Pd—OCNT, and $Pd^{\delta+}$—OCNT, respectively.

TABLE 1

| | Entry | | |
|---|---|---|---|
| Parameter | Pd Metal | H—Pd-OCNT | $Pd^{\delta+}$-OCNT |
| Independent Points | 12.9267578 | 8.7089844 | 13.296875 |
| Number of Variables | 4 | 4 | 7 |
| Reduced Chi-square | 2185.0284425 | 523.9641474 | 126.9657377 |
| R-factor | 0.0042065 | 0.0138021 | 0.0270848 |
| k-range ($Å^{-1}$) | 3.000-13.931 | 2.488-11.601 | 2.015-11.296 |
| R-range (Å) | 1.3-3.2 | 1.761-3.3 | 1.1-3.4 |
| Number of Data Set | 1 | 1 | 1 |
| Structure Model 1 | | | |
| Chemical Formula | Pd | | |
| Space Group | Fm-3m | | |
| Lattice Constant | 3.900 Å | | |
| Structure Model 2 | | | |
| Chemical Formula | PdO | | |
| Space Group | $P4_2/mmc$ | | |
| Lattice Constant | a = b = 3.096 Å, c = 5.442 Å | | |

TABLE 2

(Pd metal)

| Path | Coordination Number [a] | $E_0$ (eV) | R (Å) | $\sigma^2$ ($Å^2$) | Remarks |
|---|---|---|---|---|---|
| Pd—Pd | 12 | 3.4(3) | 2.733(6) | 0.0055(2) | Pd |

[a] Amplitude reduction factor was attained from this fitting. All fitting was done in R-space

TABLE 3

(H—Pd-OCNT)

| Path | Coordination Number [a] | $E_0$ (eV) | R (Å) | $\sigma^2$ ($Å^2$) | Remarks |
|---|---|---|---|---|---|
| Pd—Pd | 7.3(9) | 2.4(8) | 2.733(6) | 0.0058(9) | Pd |

[a] Amplitude reduction factor was attained from the reference Pd metal foil. All the fitting was done in R-space.

TABLE 4

($Pd^{\delta+}$-OCNT)

| Path | Coordination Number [a] | $E_0$ (eV) | R (Å) | $\sigma^2$ ($Å^2$) | Remarks |
|---|---|---|---|---|---|
| Pd—Pd | 2.5(6) | 0.29 [b] | 2.743(6) | 0.004(2) | Pd |
| Pd—O | 2.7(4) | 10(1) | 2.11(2) | 0.008(4) | PdO |

[a] Amplitude reduction factor was attained from the reference Pd metal foil. All the fitting was done in R-space
[b] Fixed during the fitting.

The coordination number (CN) of Pd—Pd and Pd—O in $Pd^{\delta+}$—OCNT was found to be 2.5 and 2.7, respectively, suggesting that Pd was coordinated to both Pd and O in the small clusters, and the Pd clusters were partially oxidized. In contrast, the H—Pd—OCNT sample was characterized by a Pd—Pd CN of 7.9, which represented a larger metallic Pd particle (>3 nm) and was consistent with the TEM results.

Figure 3A:
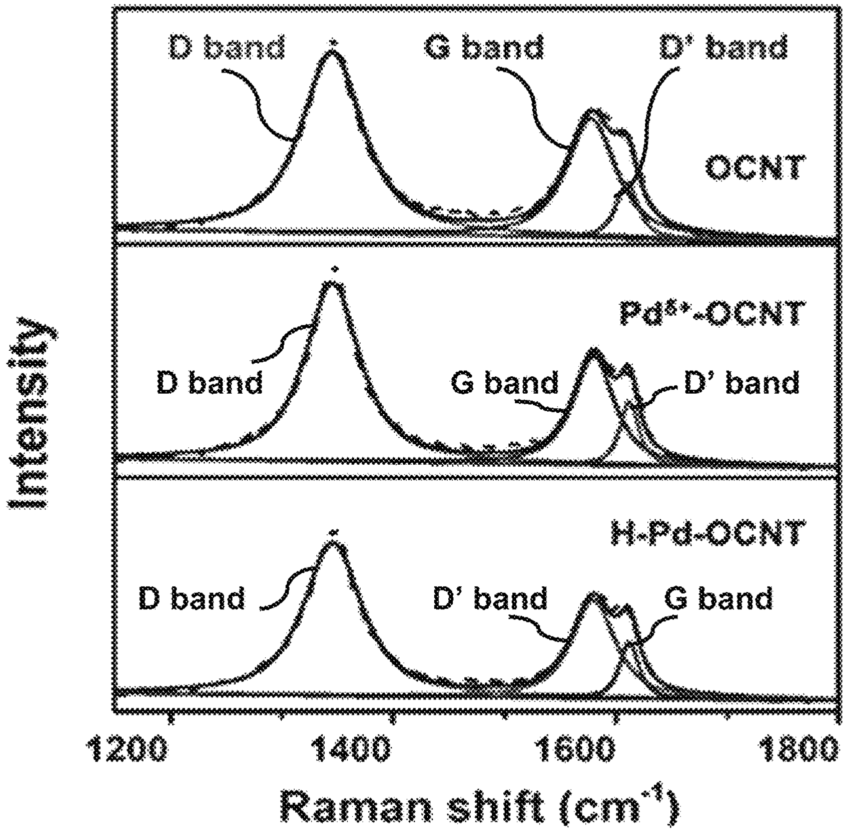
FIGS. 3A-3C illustrate characterization of defects and functional groups in $Pd^{\delta+}$—OCNT and H—Pd—OCNT electrocatalysts using Raman spectra (FIG. 3A) and FTIR spectra (FIG. 3B) of 6.5 h OCNT, $Pd^{\delta+}$—OCNT and H—Pd—OCNT.
Figure 3B:
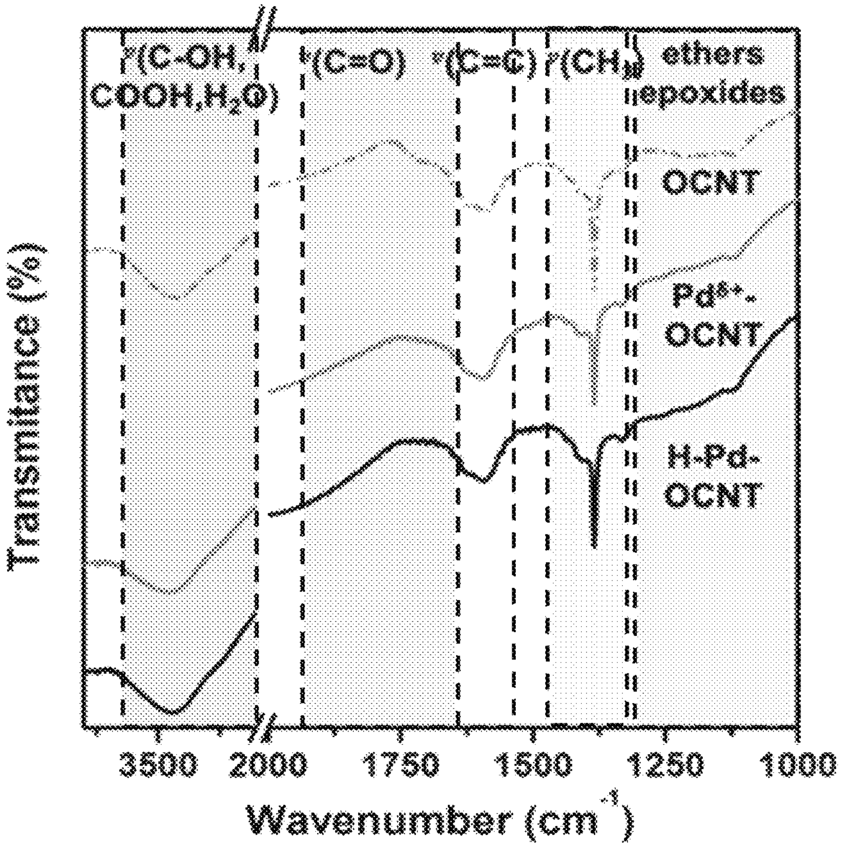

After deposition of Pd clusters, the surface properties of different samples were further compared. The $I_D$ $I_G$ ratio in the Raman spectra (FIG. 3A) was 1.82 and 1.71 for Pd□+—OCNT and H—Pd—OCNT, respectively, showing negligible changes of defects after Pd deposition and heat treatment as compared with the OCNT ($I_D$ $I_G$=1.88). Also, the basal plane $sp^2$ carbon oxidization sites still remained in both $Pd^{\delta+}$—OCNT and H—Pd—OCNT as shown by the D'band. FTIR results, shown in FIG. 3B, indicated that the types of surface functional groups (C═O, C—O) were maintained after Pd deposition and annealing. Peak assignments, shown by the dashed lines, were as follows: hydroxyls (broad peak at 3050-3800 $cm^{-1}$), C═O (1700-1900 $cm^{-1}$), C═C (1500-1600 $cm^{-1}$), $CH_3$ (1375 $cm^{-1}$) and ethers and epoxides (1000-1280 $cm^{-1}$).

Figure 3C:
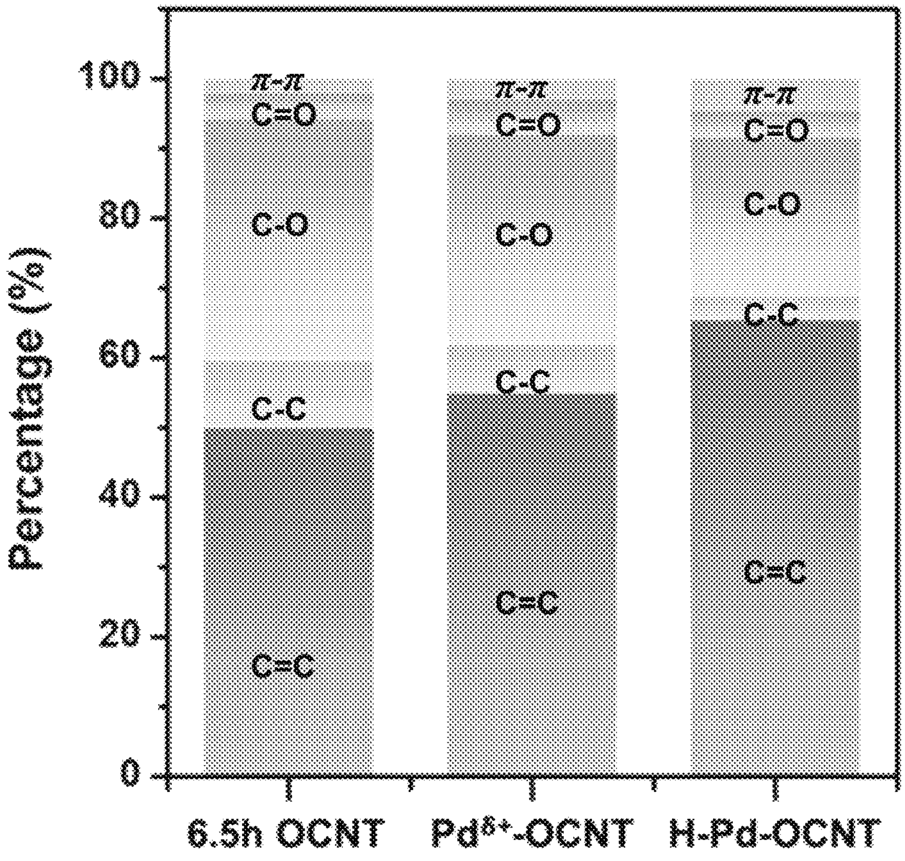

XPS results also showed similar abundance of $sp^3$ carbon defects, C—O and C═O with OCNTs, further suggesting that the deposition of Pd clusters did not change the surface properties of the OCNTs. For H—Pd—OCNT, the ratio of $sp^3$ carbon defects and C—O group decreased with an increase of C═C ratio, as shown in FIG. 3C. This result is likely due to the cleavage of less thermally stable functional groups under annealing. Such a catalyst structure allows identification of the unique role of the partially oxidized Pd clusters in catalyzing the $2e^-$ ORR by isolating the effect of Pd and the defect carbon substrates.

Figure 4A:
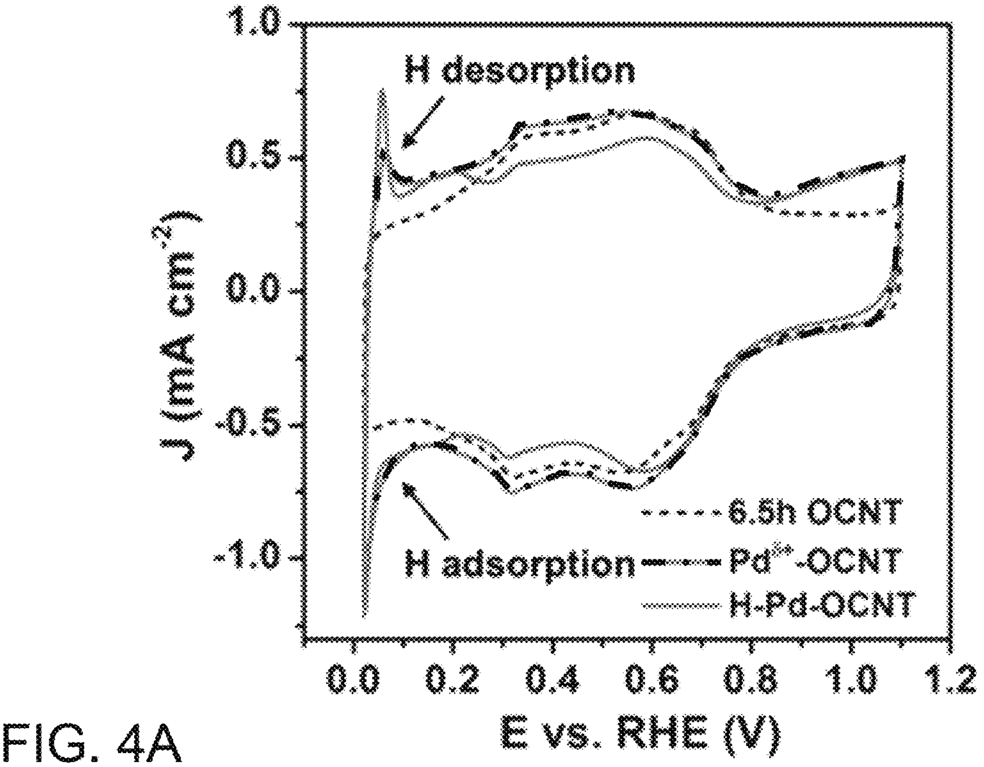
FIGS. 4A-4C illustrate electrochemical performance of $Pd^{\delta+}$—OCNT and H—Pd—OCNT catalysts, where
Figure 4C:
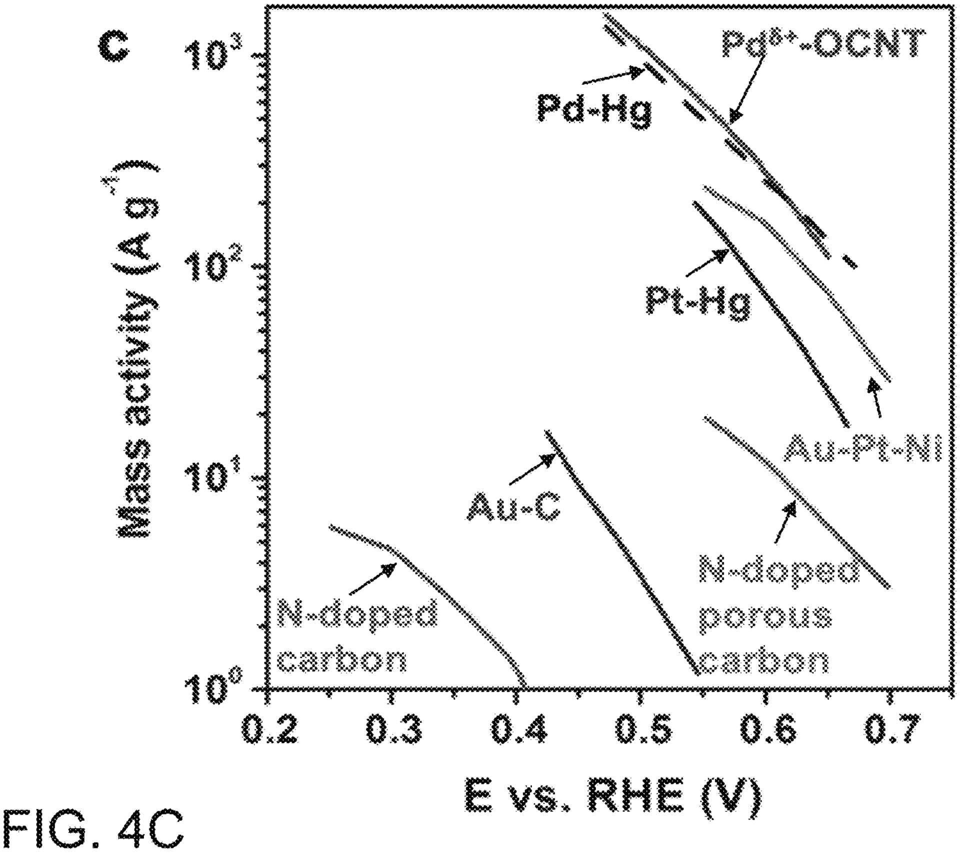

The effect of Pd clusters on the $H_2O_2$ selectivity and activity was investigated by comparing $Pd^{\delta+}$—OCNT with OCNT and H—Pd—OCNT. The electrolyte was placed in Ar-saturated 0.1 M $HClO_4$ solution and H adsorption/desorption characteristics were measured at a scan rate of 50 mV $s^{-1}$. Peaks of Pd in both $Pd^{\delta+}$—OCNT and H—Pd—OCNT electrocatalysts were observed in the CV curves shown in FIG. 4A, confirming the successful loading of Pd onto the OCNT surface. The most interesting feature for the $Pd^{8*}$—OCNT catalyst was observed in the results of the ORR process, shown in FIG. 4B. RRDE voltammograms in $O_2$-saturated $HClO_4$ electrolyte were obtained with a scan rate of 10 mV $s^{-1}$ at 1600 rpm (only the anodic cycle is shown). The $H_2O_2$ current and selectivity were calculated from the ring and disc currents for both OCNT and $Pd^{\delta+}$—OCNT. After the introduction of Pd clusters, both the ring and disc currents of $Pd^{\delta+}$—OCNT initiated earlier than that of OCNT, resulting in a positive shift of ORR onset potential by ~320 mV. The $H_2O_2$ current of the $Pd^{\delta+}$—OCNT electrocatalyst nearly overlapped with total reaction (disc) current, which suggested that the ORR almost exclusively proceeded toward the $2e^-$ pathway. The calculated $H_2O_2$ selectivity of the $Pd^{\delta+}$—OCNT catalyst was in the range of 98% to 95% in the potential range of 0.7 to 0.3 V, which is superior to precious metal-based electrocatalysts reported previously. FIG. 4C compares mass activity of various prior art electrocatalysts against the inventive electrocatalyst for $H_2O_2$ production in the acid electrolyte. As shown, the kinetic mass activity of $Pd^{\delta+}$—OCNT for $H_2O_2$ production reached 1.946 A $mg^{-1}$ at 0.45 V, about 1.5 times that of the core-shell $Pd_2Hg_5/C$ catalyst and significantly higher than that of other electrocatalysts in acidic electrolytes. As for the H—Pd—OCNT catalyst, although it showed a similar positive shift in onset potential as $Pd^{\delta+}$—OCNT, it preferred the $4e^-$ ORR pathway to completely reduce $O_2$ to $H_2O$, showing only 18% of $H_2O_2$ selectivity at 0.1 V. Thus, we conclude that the partially oxidized Pd clusters are the key in enhancing activity and maintaining high selectivity for $H_2O_2$ production.

Figure 5A:
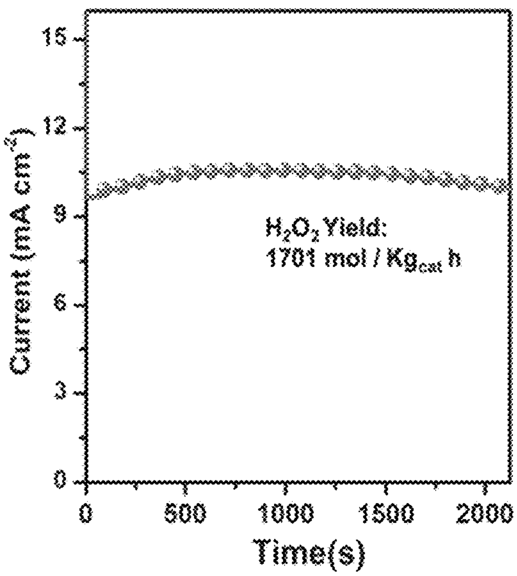
FIGS. 5A-5D illustrate yield and stability of $H_2O_2$ electrocatalysts in the acid electrolyte, where FIG. 5A provides a chronoamperometry curve of $Pd^{\delta+}$—OCNT in the H-cell test at 0.1 V.
Figure 5B:
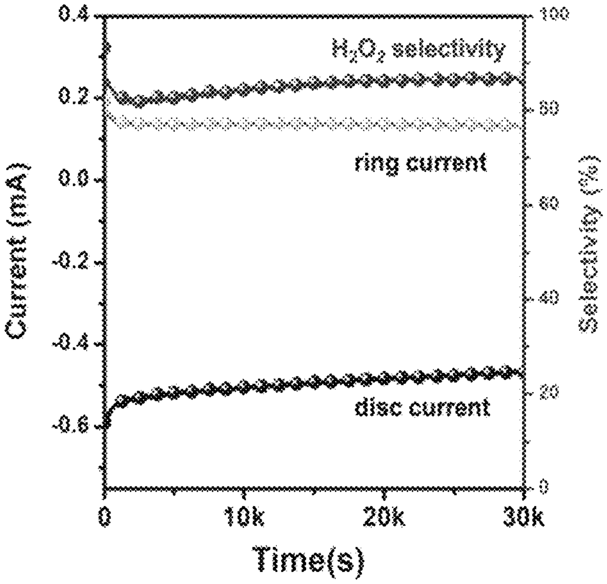
Figure 5C:
Figure 5D:

To demonstrate their viability for continuous ORR in fuel cell operations, we deposited the $Pd^{\delta+}$—OCNT electrocatalysts on carbon paper as a working electrode and fabricated a device that could synthesize $H_2O_2$ directly in acidic electrolyte. In this device, $O_2$ was reduced to yield $H_2O_2$ directly by combining with the protons in the acidic electrolyte without the need of molecular $H_2$. The amount of $H_2O_2$ generated in an H-cell was obtained by a titration method. All the experiments were performed at 25° C. When the catalyst mass loading was controlled to 0.1 mg $cm^{-2}$, a steady current density of 10 mA $cm^{-2}$ was recorded at 0.1 V, shown in FIG. 5A. The selectivity of $H_2O_2$ was measured to be 87%, which was close to the RRDE test at 0.1 V. Also, the yield of $H_2O_2$ was up to 1701 $molkg_{cat}^{-1}$ $h^{-1}$, 2 times higher than that of the single atomic Pt electrocatalyst reported recently. Importantly, the end $H_2O_2$ concentration reached 10 wt % after 35 min of operation, which could be readily used for acid-based chemical synthesis (9 wt % is commonly used). The ORR stability of $Pd_8$*—OCNT was evaluated by chronoamperometry (CA) test by holding the disk electrode potential at 0.1 V for more than 8 hr. Both the disc and ring currents decreased by only ~15% after the test and the $H_2O_2$ selectivity was still maintained at 86% as seen in FIG. 5B. It was found that the morphology and size distribution of Pd clusters on OCNTs exhibited negligible changes after the stability test, as shown by the ADF-STEM image in FIG. 5C (scale bar: 10 nm) and its corresponding EDS element mapping in FIG. 5D (scale bar: 5 nm) of $Pd^{\delta+}$—OCNT after the stability test. This negligible change appears to be responsible for their good electrochemical stability during the ORR.

Figure 6A:
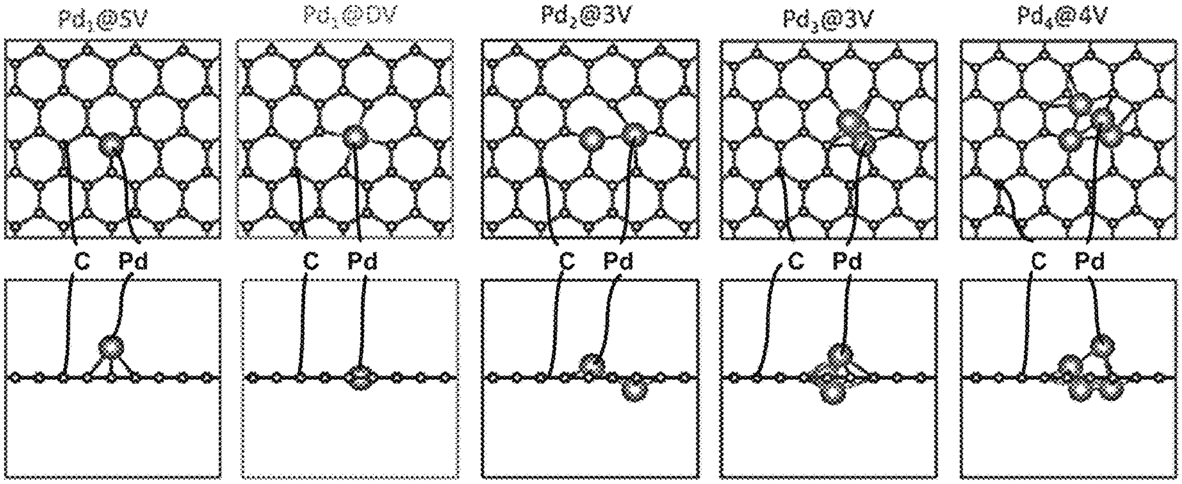
FIG. 6A shows optimized DFT model structures for $Pd_n$ clusters embedded in graphene defects.
Figure 6B:
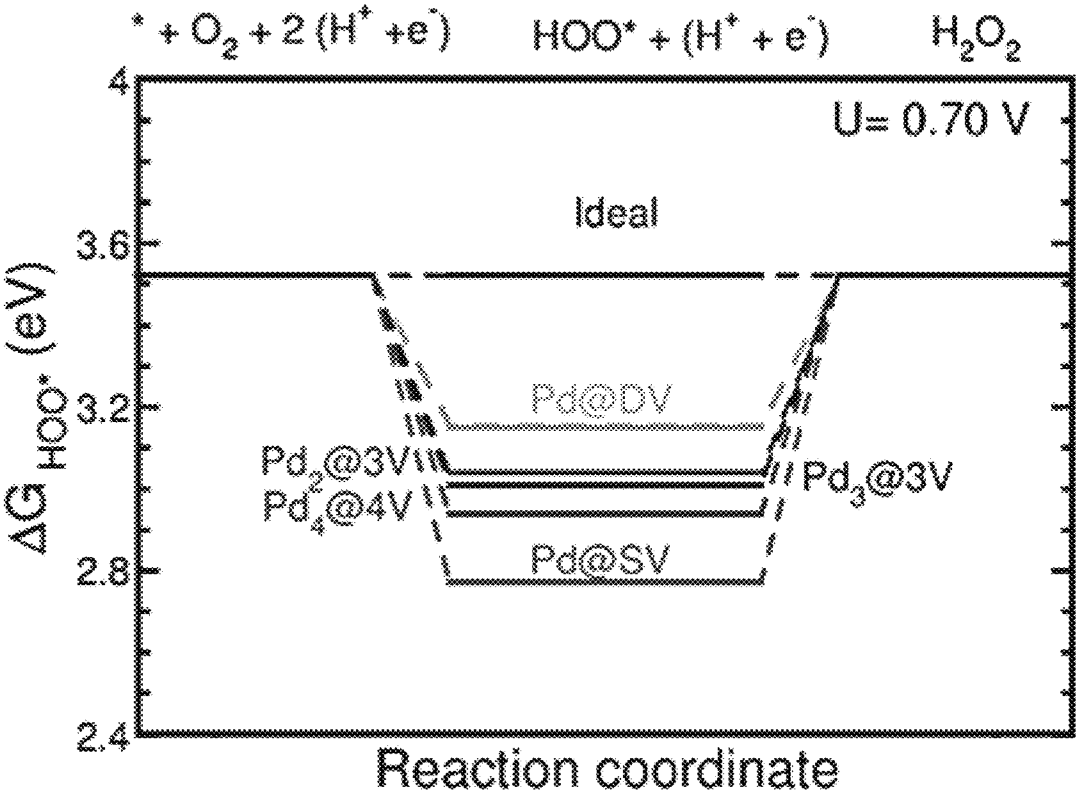
FIG. 6B is a free energy diagram for $2e^-$ ORR over the model structures of FIG. 6A at standard redox potential (0.70 V).

The enhanced $2e^-$ ORR performance of $Pd^{\delta+}$—OCNT was further investigated by DFT calculations. Since the diameter of CNT in the experiment was 10 to 20 nm, a negligible strain energy is expected hence a two-dimensional graphene sheet was used as a model structure. The Pd clusters in defect CNT were first studied by modeling a variety of Pd clusters ranging from 1 to 4 Pd atoms trapped in the vacancies of the graphene substrate, as shown in FIG. 6A, which provides the optimized DFT model structures for $Pd_n$ clusters embedded in graphene defects, wherein C and Pd atoms are labeled. For $Pd_1$, (the $1^{st}$ and $2^{nd}$ panels from the left), the possibility of a Pd atom being trapped in either single vacancy or double vacancy of graphene was considered. Larger vacancies were required to trap the $Pd_2$, $Pd_3$ and $Pd_4$ clusters ($3^{rd}$, $4^{th}$ and $5^{th}$ panels). For $Pd_2$ and $Pd_3$ a vacancy with at least 3 missing carbon atoms was required, while for $Pd_4$ a vacancy with 4 missing carbon atoms was a prerequisite to form a sufficiently stable structure. The $2e^-$ ORR proceeds via $1e^-$ reduction of $O_2$ to a hydroperoxide radical (HOO*) and subsequent $1e^-$ reduction of HOO* to $H_2O_2$ where both reduction steps involve HOO* as the sole intermediate. It has been shown that the adsorption energy of HOO* was the key activity descriptor for the $2e^-$ ORR, where the maximum activity observed at an optimized binding of the HOO* intermediate. Therefore, the HOO* adsorption energies were calculated on all the model structures. The results are summarized in FIG. 6B in the form of the free energy diagram at the equilibrium potential of the $2e^-$ ORR (0.70V) over the different model structures. An ideal catalyst should have a flat free energy diagram at this potential (0.70 V), exhibiting highest catalytic activity with zero overpotential. This plot shows that none of the examined structures is sufficiently active for $2e^-$ ORR as they all bind HOO* too strongly such that further reduction of HOO* to $H_2O_2$ becomes a bottleneck. Consequently, the bare Pd clusters trapped in the graphene vacancies are not likely the active sites for the $2e^-$ ORR. In fact, the strong tendency of Pd clusters toward adsorbing HOO* results in dissociating the HOO* species to form HO* and O*, indicating that metallic Pd atoms prefer $4e^-$ ORR. Next, the effect of oxidation, both in the Pd clusters and CNT, was investigated to unravel the active sites responsible for the high $2e^-$ ORR activity observed in the experiment.

Figure 7A:
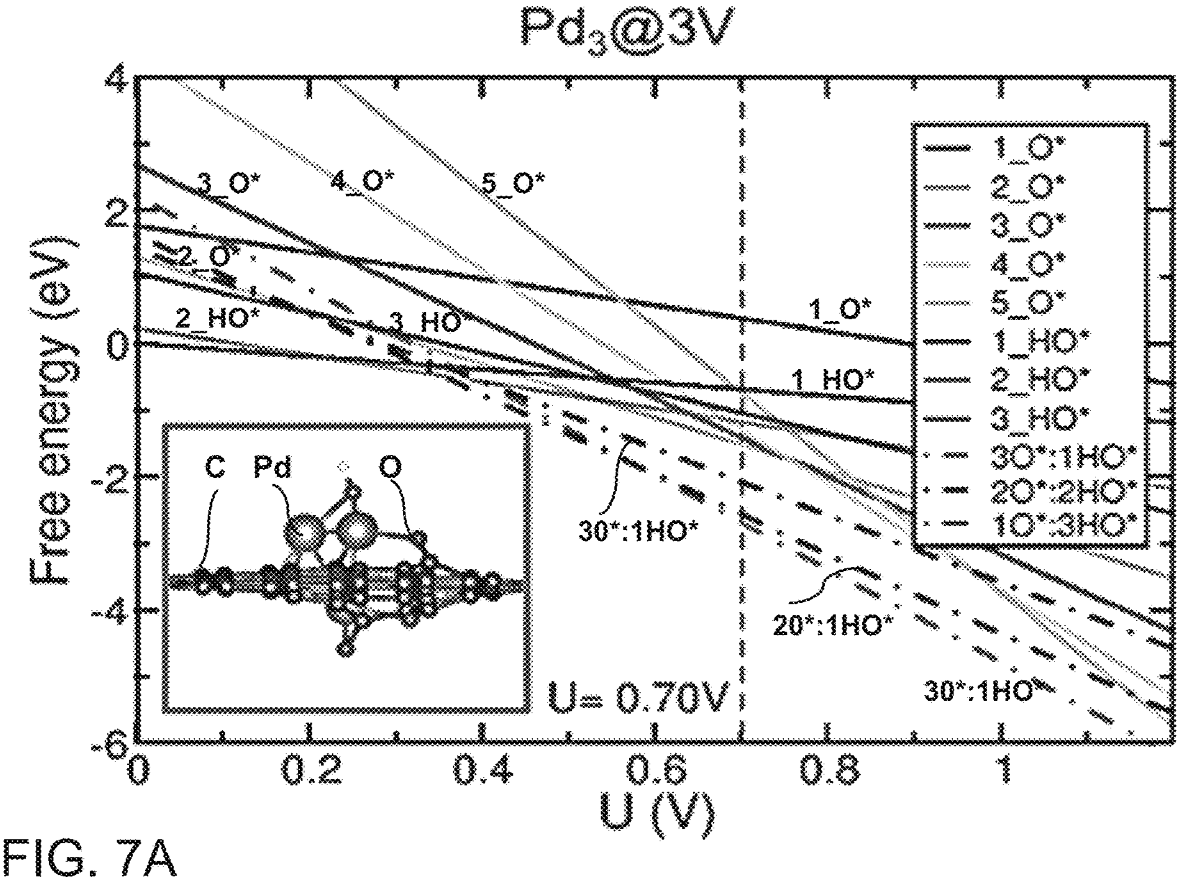
FIG. 7A is a Pourbiax diagram for determining the steady state coverage of the oxygenated species on $Pd_3$ under $2e^-$ ORR standard redox potential (0.70 V)
Figure 7B:
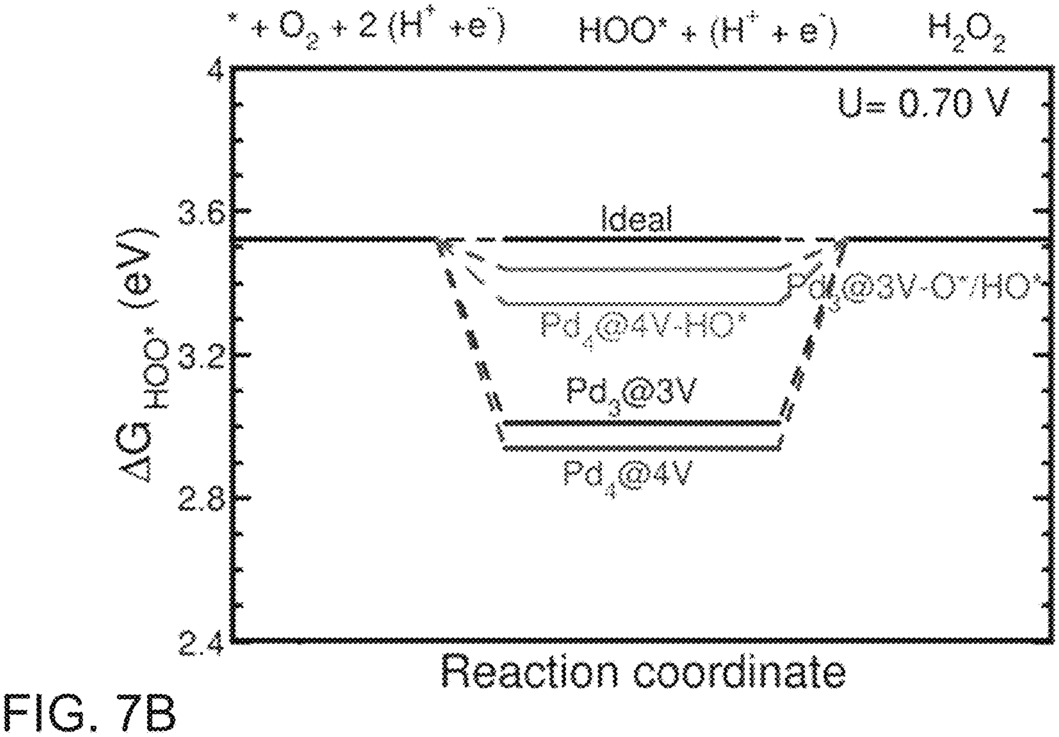
FIG. 7B is a free energy diagram for $2e^-$ ORR over the most stable structure from Pourbiax analysis at 0.70 V.

FIG. 7A is a Pourbiax diagram for determining the steady state coverage of the oxygenated species on $Pd_3$ under $2e^-$ ORR standard redox potential (0.70 V). The inset shows a side view of the most stable coverage with the atomic structure labeled as indicated. At the potential of 0.70V, it is highly likely that the Pd clusters are covered with several 0*, HO* species or a combination of both. To study the oxygenated species coverage effect, only $Pd_3$ and $Pd_4$ were considered, which were consistent with the experimental measurements of the Pd cluster size (0.6 nm). We further took these partially oxidized $Pd_n$ clusters and calculated the HOO* adsorption energy to model the $2e^-$ ORR and to identify trends in activity. FIG. 7B is a free energy diagram showing the calculated formation energy of a variety of possible O*/HO* coverages on $Pd_3$ and $Pd_4$ clusters as a function of applied potential. The lowest line at 0.70V displays the most stable coverage. For $Pd_3$, 3O*/HO* was the steady state oxygen coverage, while for $Pd_4$, it was 3HO*. These results suggest the presence of the Pd—O bonds, in agreement with the EXAFS results. These results indicate that the oxygen coverage on the $Pd_n$ clusters improves the HOO* adsorption energy and brings it closer to the range with high ORR activity.

Figure 7C:
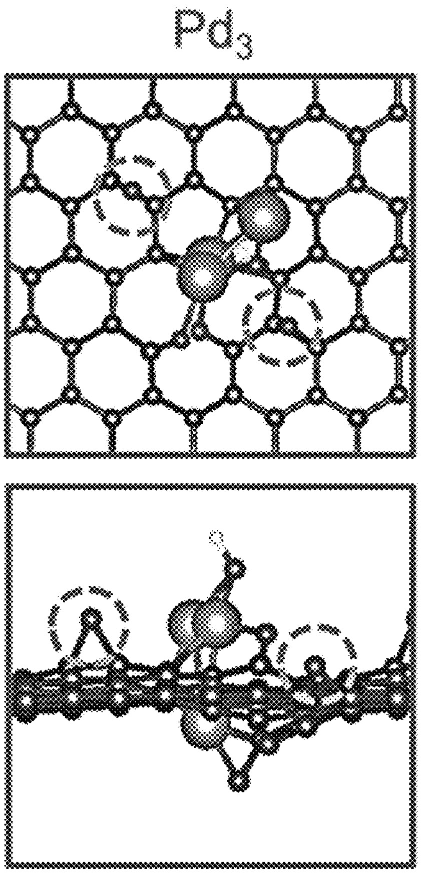
FIG. 7C shows optimized DFT model structures with nearby epoxy functional groups on the most stable O*/HO* covered $Pd_3$ and $Pd_4$ clusters.
Figure 7D:
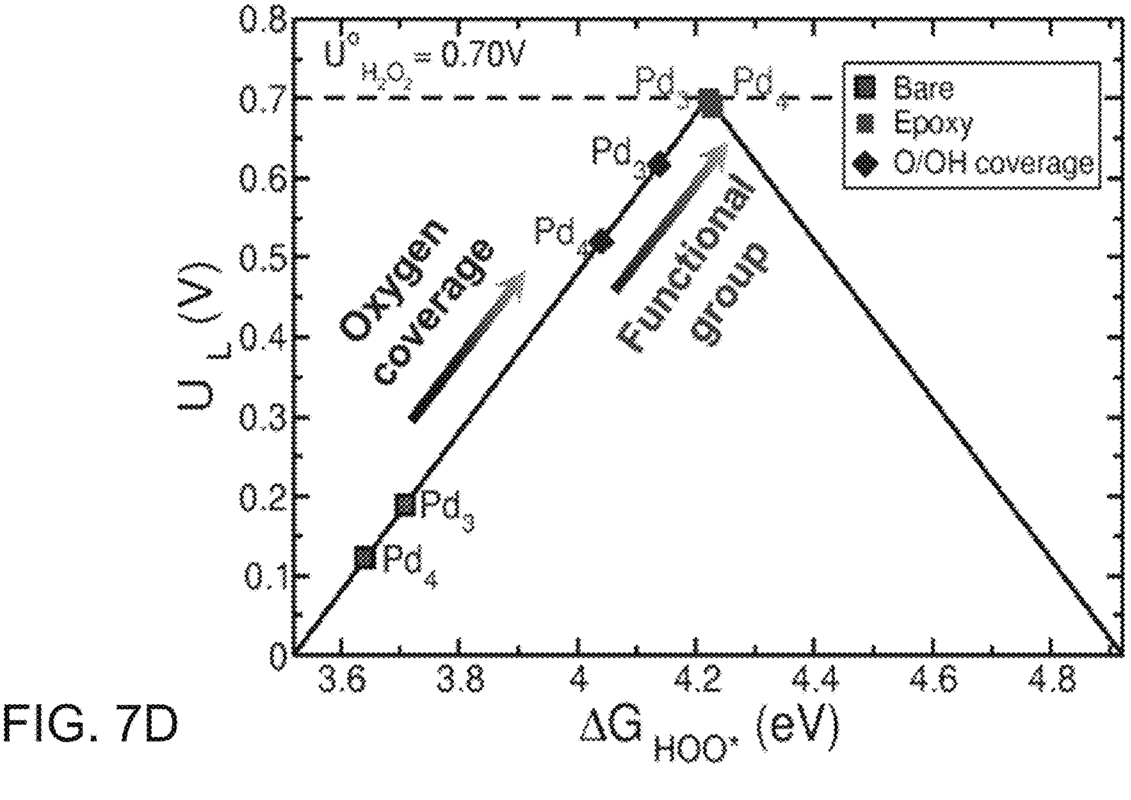
FIG. 7D is an activity volcano plot.

The CNT substrate was already oxidized from the experimental results, further DFT calculations were performed to examine the effect of neighboring oxygen functional groups on the HOO* adsorption energy. As an example, an oxygen-containing functional group such as epoxy was used to account for the C—O moiety. FIG. 7C displays the optimized DFT atomic structures in the presence of two nearby epoxy functional groups (indicated by dashed circles) on the most stable O*/HO* covered $Pd_3$ and $Pd_4$ clusters. As in prior structure diagrams, the smaller atoms are C, the larger atoms are Pd. The results are summarized in the activity volcano plot in FIG. 7D, where they axis is the calculated limiting potential ($U_L$), defined as the maximum potential at which the reaction steps become downhill in free energy. The x axis is the calculated free energy of HOO*. The horizontal dashed line is the standard redox potential for the $2e^-$ ORR (0.70 V). The calculated limiting potential ($U_L$) is used as an indicator of activity toward the $2e^-$ ORR, which is defined as the maximum potential at which both $1e^-$ reduction of $O_2$ to HOO* and subsequent $1e^-$ reduction of HOO* to $H_2O_2$ are downhill in free energy. The maximum activity is therefore achieved at the HOO* binding energy of 4.22 eV, which corresponds to the value at the peak of volcano. The results show that the presence of a nearby functional group further improves the activity of both $Pd_3$ and $Pd_4$ and places them at the peak of the activity volcano with zero overpotential. It also shows that the synergy between the oxygen coverage and oxygen functional group plays an important role in improving the catalytic activity of small Pd clusters anchored in OCNT. Therefore, we conclude that the high activity and selectivity observed in the experiments is a direct consequence of the synergy between partially oxidized Pd clusters and oxidized CNT substrate. These two effects together significantly improve the $2e^-$ ORR activity while maintaining high selectivity.

The disclosure herein describes a novel class of $2e^-$ ORR electrocatalysts formed by the synergistic interaction between partially oxidized Pd clusters and oxygen-functionalized CNT substrate. Through a simple solution-impregnation method, $Pd_3$ and $Pd_4$ clusters can be readily deposited on OCNTs with the coordination number of Pd—Pd and Pd—O of 2.5 and 2.7, respectively, as confirmed by the EXAFS characterization. The inventive $Pd^{\delta+}$—OCNT electrocatalyst exhibited high $H_2O_2$ selectivity at 95% to 98% in a wide potential range of 0.3 to 0.7 V, and a positive shift of the $2e^-$ ORR onset potential by ~320 mV compared to the OCNT substrate. The mass activity of $Pd^{\delta+}$—OCNT was 1.946 A $mg^{-1}$ at 0.45 V, 1.5-fold higher than $Pd_2Hg_5/C$, which was the best electrocatalyst reported for $H_2O_2$ synthesis in acidic electrolytes.

The $H_2O_2$ yield rate was estimated to be 1700 mol k $g_{cat}^{-1}$ $h^{-1}$ in an H-cell test, and the $Pd^{\delta+}$—OCNT electrocatalyst maintained excellent stability with no decrease of the $H_2O_2$ selectivity above 8 h of testing. These results demonstrate the effectiveness of the novel class of catalysts for the electrochemical synthesis of $H_2O_2$. Table 5 provides a comparison of characteristics of noble-metal based electrocatalysts for $2e^-$ ORR in acid electrolyte.

TABLE 5

| Materials | selectivity | Onset potential | Mass activity ($A\ g^{-1}$) 0.55 V | Mass activity* ($A\ mg^{-1}$) 0.45 V |
|---|---|---|---|---|
| $Pd^{\delta+}$-OCNT | 95% | 0.70 V | 597 | 1.946 |
| Pt/TiN | 65% | ~0.70 V | — | 0.87 |
| $Pd_2Hg_5/C$ | ~95% | ~0.70 V | 530 | 1.366 |
| $PtHg_4/C$ | ~95% | ~0.60 V | 167 | — |
| AuPd/C | 80% | ~0.70 V | — | — |
| Carbon-coated Pt nanoparticles | 41% | ~0.70 V | — | — |

DFT calculations further suggest that the coordination between oxygen-modified Pd clusters and the oxygen-containing functional groups on OCNT is the key for their high selectivity and activity for $2e^-$ ORR. Selectivity can be varied by simply tuning the interactions between the active metal and the oxidized carbon support.

EXAMPLES

The following examples describe various procedures and methods used in the testing and evaluation of the inventive electrocatalyst disclosed herein.

Example 1: Characterization

The defect formation process and distribution Pd clusters of different samples were characterized by high-angle annular dark-field scanning transmission electron microscopy (HAADF-STEM, Hitachi HD 2700C). Energy dispersive X-ray spectroscopy (EDS) was performed by FEI Talos F200X to obtain element distributions of Pd on each sample. The structure and phase composition were further characterized by X-ray diffractometer (XRD, Bruker AXS) equipped with a Cu Kα radiation source (=1.5406 Å). The specific mass loading of the Pd atomic clusters was determined by inductively coupled plasma mass spectrometry (ICP-MS, iCAP Qc, Thermo Fisher Scientific). To investigate the heteroatoms and functional groups, a commercial SPECS Ambient-pressure X-ray photoelectron spectrum (AP-XPS) chamber combined with a PHOIBOS 150 EP MCD-9 analyzer and Fourier-transform infrared spectroscopy (FTIR, Nicolet iS50) were used. The Raman spectra were acquired by a Renishaw inVia with 532 nm laser source. Nitrogen adsorption/desorption were conducted by an autosorb iQ2.

Example 2: Electrochemical Measurements

Electrochemical testing was performed in three-electrode cells, where a graphite and Ag/AgCl (3M $Cl^-$) were used as the counter electrode and reference electrode, respectively. The electrocatalyst inks were prepared by dispersing samples in a Milli-Q and isopropanol solution (4:1) with 10 μl of Nafion (5%) to achieve the mass concentration of 1 mg $ml^{-1}$ for $Pd^{\delta+}$—OCNT and H—Pd—OCNT samples, 3.5 mg $ml^{-1}$ for O—CNT samples. 10 μl of each catalyst ink was then deposited on a pre-cleaned glassy carbon (GC) electrode (0.196 $cm^{-2}$). The cyclic voltammetry (CV) curves were recorded in Ar-saturated 0.1 M $HClO_4$ electrolyte with a scanning rate of 50 mV $s^{-1}$. The ORR performance was examined by rotating disk electrode (RDE) and rotating ring disk electrode (RRDE) in an $O_2$-saturated 0.1 M $HClO_4$ solution at a scanning rate of 10 mV $s^{-1}$ with capacity current correction (in Ar-saturated 0.1 M $HClO_4$). The ring current was held at 1.2 V (vs. RHE) to further oxidize the as-formed $H_2O_2$ and collection efficiency was calibrated to be 0.37. The stability test was performed by CA test at 0.1 V for 30000 s. The selectivity was calculated as detailed below.

Figure 4B:
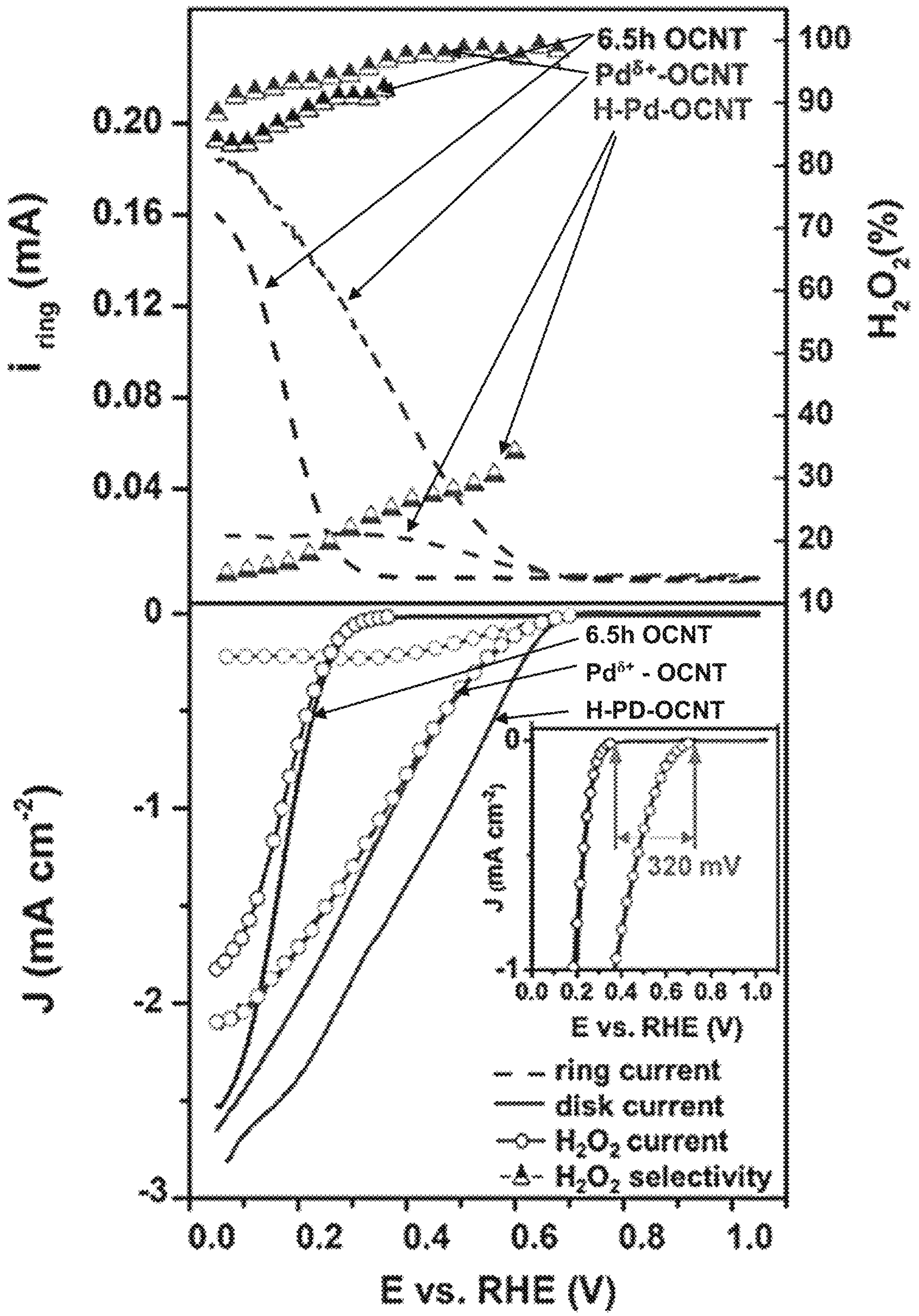

The $H_2O_2$ selectivity of samples based on RDE was calculated by Koutecky-Levich (K-L) plot in equation (1, 2) from the polarization curves at different rotation speeds.

$$\frac{1}{j} = \frac{1}{j_{kin}} + \frac{1}{j_{diff}} = \frac{1}{j_{kin}} + \frac{1}{B \cdot \sqrt{\omega}} \tag{1}$$

$$B = 0.62 \cdot n \cdot F \cdot D_{O_2}^{2/3} \cdot v^{-1/6} \cdot C_{o_2} \tag{2}$$

where j is the current density consists of a kinetic current ($j_{kin}$) and a diffusion current ($j_{diff}$), ω is the rotation speed, n is the number of electrons transferred during the reaction, and $D_{o_2}$ and $C_{o_2}$ are the diffusivity and solubility of oxygen, respectively; F is the Faraday constant, and v is the kinematic viscosity of the electrolyte. For a $4e^-$ process, B=0.47 mA $cm^{-2}$ $s^{1/2}$, and for a 2e– process, B=0.23 mA $cm^{-2}$ $s^{1/2}$.[19] For RRDE tests, the $H_2O_2$ selectivity was calculated by equation (3).

$$H_2O_2(\%) = 200 * \frac{I_R/N}{I_D + I_R/N} \tag{3}$$

where $I_R$ and $I_D$ are the ring current and disk current, respectively; and Nis the collection efficiency. Results of this analysis are shown in FIG. 4B.

To further confirm the selectivity of the $Pd^{\delta+}$—OCNT electrocatalyst, a H-cell with a Nafion 117 membrane was used. Electrocatalysts were loaded on TEFLON©-treated carbon papers (0.1 mg $cm^{-2}$). The concentration of generated $H_2O_2$ was measured by its reaction with $Ce(SO_4)_2$ ($2Ce^{4+}+H_2O_2 \rightarrow 2Ce^{3+}+2H^{+}+O_2$). The color of solution changes from yellow to colorless through the reaction. The concentration of $Ce^{4+}$ after the reaction was measured by ultraviolet-visible spectroscopy (UV-VIS, Perkin Elmer UV-VIS-NIR Spectrometer) with 316 nm of wavelength.

Example 3: X-Ray Absorption Fine Structure (XAFS) Measurements

X-ray Absorption Fine Structure (XAFS) measurements were conducted in the 7-BM beamline (QAS) at National Synchrotron Light Source-II (NSLS-II) at Brookhaven National Laboratory. Both transmission and fluorescent signals were detected. The typical duration for a single spectrum was 47 sec and thirty spectra were merged to get high signal-to-noise spectrum at each potential. During all of the XAFS measurements, the spectrum of reference Pd foil was simultaneously recorded, and was further used for calibrating the edge energy ($E_0$) of the sample under analysis.

The obtained spectra were processed using the ATHENA and ARTEMIS software in IFFEFIT package. The procedure which was described in B. Ravel et al. (ATHENA, ARTEMIS, HEPHAESTUS: data analysis for X-ray absorption spectroscopy using IFEFFIT. *J. Synchrotron Radiat.* 12, 537-541 (2005)), was followed during the data process. EXAFS analyses were conducted by using the ARTEMIS software. The EXAFS spectrum ($\chi(k)$) was weighted with $k^2$ value to intensify the signal at high k-regime. The Hanning window was utilized for the Fourier-transform. All of the EXAFS fitting was done in the R-space. The goodness of fitting was evaluated based on the reliable factor (R-factor) and reduced chi-square (reduced $\chi^2$). The fitting results are tabulated in Tables 1-4 above.

Example 4: Computational Methods

Figure 8A:
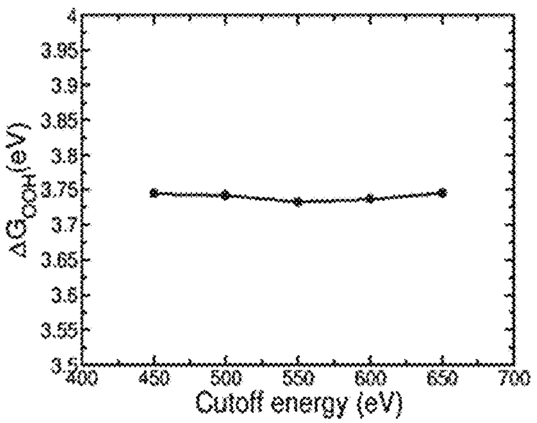
FIGS. 8A-8B are the cutoff energy convergency plots for the calculated adsorption energy of OOH* and calculated limiting potential respectively.
Figure 8B:
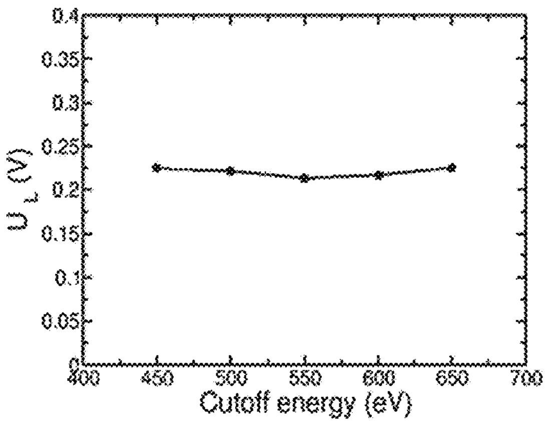
Figure 8C:
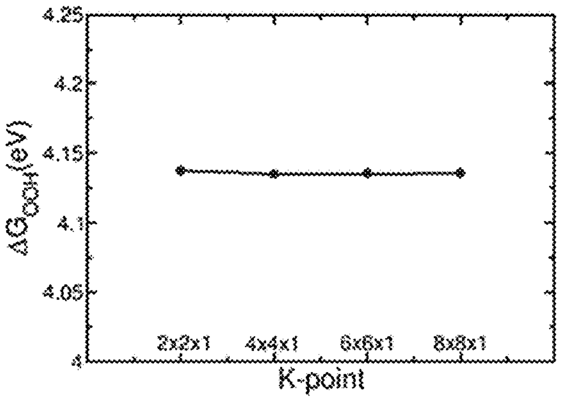
FIGS. 8C-8D are the calculated adsorption energy of OOH* and calculated limiting potential for different K-point sampling, respectively.
Figure 8D:
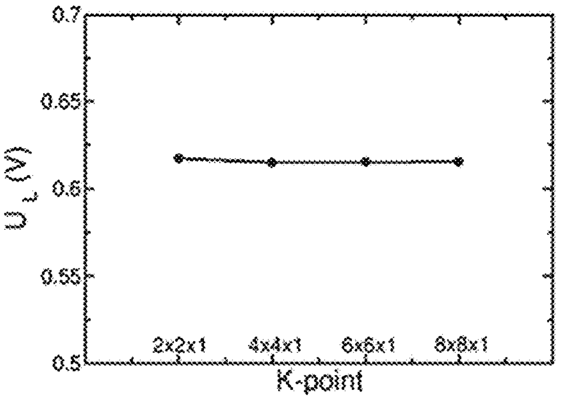

Atomic Simulation Environment (ASE) (see Bahn, S. R. & Jacobsen, K. W, *Comput. Sci. Eng.* 4, 56-66 (2002)) was used to handle the simulation and the QUANTUM ESPRESSO (Giannozzi, P. et al., *J. Phys.: Condens. Matter* 21, 395502, 1-19, (2009)) program package to perform electronic structure calculations. The electronic wavefunctions were expanded in plane waves up to a cutoff energy of 500 eV, while the electron density is represented on a grid with an energy cutoff of 5000 eV. FIGS. 8A and 8B display the energy cutoff convergency plots for calculated adsorption energies and limiting potentials for an example of our model calculations ($Pd_2$ cluster). Core electrons were approximated using ultrasoft pseudopotentials. To describe chemisorption properties on graphene structures, PBE exchange-correlation functional with dispersion correction was used. Graphene structures were modeled as one layer with a vacuum of 20 Å to decouple the periodic replicas. A 5x5 super cell lateral size was used to model $Pd_1$ and $Pd_2$ clusters and the Brillouin zone was sampled with (4x4x1) Monkhorst-Pack k-points. For the larger clusters of $Pd_3$ and $Pd_4$ we used a 7x7 super cell lateral size with (2x2x1) Monkhorst-Pack k-points sampling. FIGS. 8C and 8D display the k-point sampling convergency plots for the calculated adsorption energies and limiting potentials for an example of our model calculations ($Pd_3$ cluster covered with 3O* and 1HO*).

Example 5: Electrocatalyst Mass Loadings

Additional H-cell experiments were performed with increased electrocatalyst mass loadings. Stable current densities of 19 and 55 mA $cm^{-2}$ could be obtained when the electrocatalyst mass loadings were increased to 0.2 and 0.6 mg $cm^{-2}$, respectively. When the mass loading increased to 1.2 mg $cm^{-2}$, the thick catalyst layer (catalysts were deposited on a relatively small area of ~0.49 $cm^{-2}$ due to the size limit of the chamber) cracked more easily and the catalysts tended to feel off the electrode during the test due to the large 02 flux, resulting in current density decay from 100 to 78 mA $cm^{-2}$ during the 1 h operation.

Example 6: Additional Oxygen Functional Groups

Figure 9:
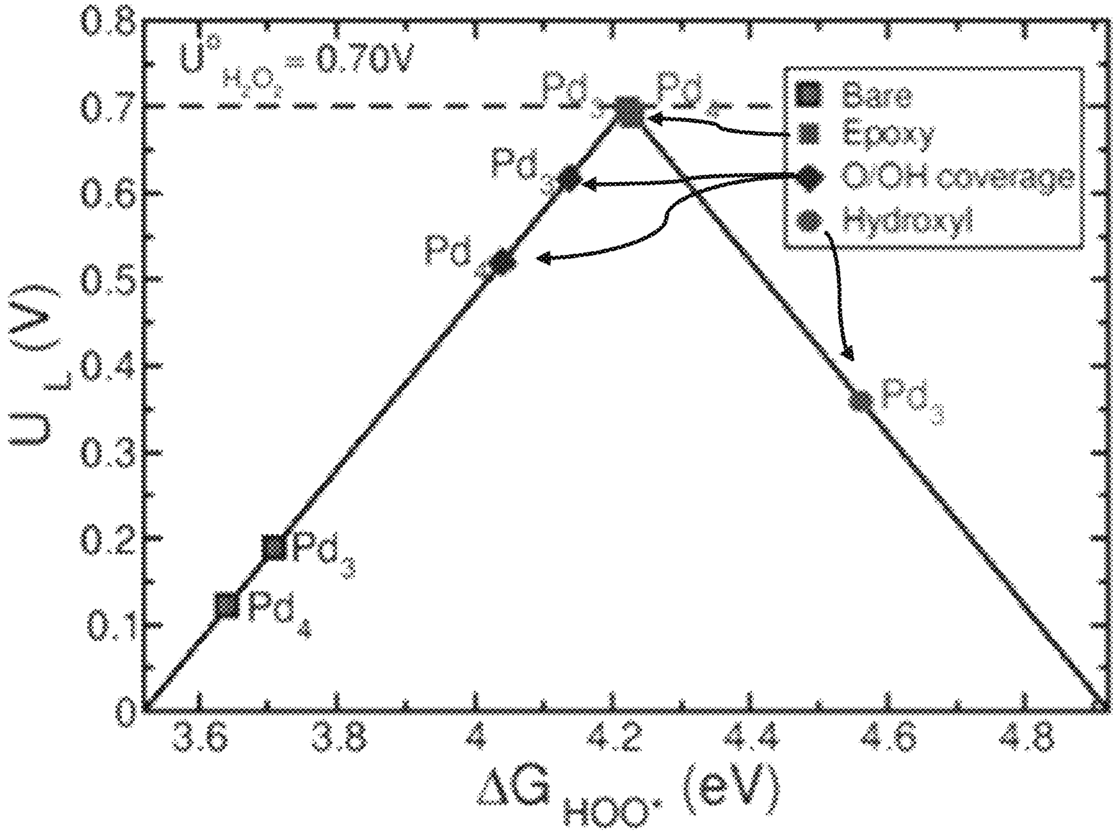
FIG. 9 is activity volcano plot, including the hydroxyl functional group for different $Pd_3$ clusters.

The effect of a range of different oxygen functional groups was evaluated including hydroxyl, carbonyl and etheric groups. Among all these functional groups, epoxy groups were found to have the most meaningful impact on the $\Delta G_{HOO}$*, which aligned well with the experimental results. FIG. 9 displays the activity volcano including an example of the effect of hydroxyl group on the adsorption energy of HOO* and calculated limiting potential for $Pd_3$ covered with 3O*:1HO*. The results show that similar to epoxy group, including the hydroxyl functional group weakens the adsorption energy of HOO*. This in turn results in increasing the selectivity toward $H_2O_2$, however, the calculated limiting potential is not significantly high.

Example 7:—Small Scale Hydrogen Peroxide Production Assembly

An example of a simple, inexpensive table-top set-up for on-demand production of $H_2O_2$ is shown in FIG. 10. In this example, the assembly 10 includes a multi-port H-cell 12, a glass/Pyrex container that is commonly used for electrochemical studies, with four ports. Cap/stopper 18 (on the left-hand port as shown) supports counter electrode 20. Cap/stopper 17 supports reference electrode 24. Cap/stopper 15 supports working electrode 22 and oxygen inlet 30. The two chambers of the H-cell, which support the anodic and cathodic reactions, are physically separated by a Nafion membrane 18. Cap/stopper 16 is removed and the chambers are filled with a commercial off-the-shelf electrolyte 40, such as $HClO_4$, and the cap is replaced. The inventive $Pd^{\delta+}$—OCNT electrocatalyst is added through one of the ports in the right chamber, and magnetic stirring bar 32 is activated by switching on magnetic stirrer 34. Electrical potential, e.g., 0.3V-0.7V, is applied across electrodes 20 and 22 while oxygen is injected through inlet 30. A similar arrangement can be made with a small flask to provide a simple, portable on-demand "factory" for producing $H_2O_2$. This arrangement can be scaled up as needed and may be combined in a single assembly that can be simply plugged in to produce fresh $H_2O_2$ as needed on-site. Use of this approach could save up to 50-70% in costs of production without the need for shipping or storage, using a method that is less toxic than existing industrial processes.

The invention claimed is:

1. An oxidation reduction catalyst for producing hydrogen peroxide comprising:

a carbon substrate having oxidation defects induced therein; and noble metal clusters trapped within the oxidation defects via solution impregnation, wherein the noble metal clusters are partially oxidized;

wherein a composition of the noble metal clusters and the carbon substrate induce a selective 2-electron oxygen reduction reaction in an acidic electrolyte.

2. The catalyst of claim 1, wherein the carbon substrate comprises a nanostructured carbon selected from carbon nanotubes, carbon black and graphene.

3. The catalyst of claim 1, wherein the oxidation defects are induced by exposing the carbon substrate to $HNO_3$ for a predetermined time.

4. The catalyst of claim 3, wherein the predetermined time is 6.5 hours.

5. The catalyst of claim 1, wherein the oxidation defects comprise C—C, C—O, C=O functional groups.

6. The catalyst of 1, wherein the noble metal clusters are one or a combination of $Pd_3$ and $Pd_4$.

7. The catalyst of 1, wherein the noble metal clusters are at least partially amorphous.

8. The catalyst of claim 1, wherein the acidic electrolyte is $HClO_4$, $HNO_3$, or $H_2SO_4$.

9. The catalyst of claim 1, wherein the composition is formed by:

suspending carbon nanotubes and $PdCl_2$ in a nitric acid solution;

heating and stirring the suspension until a dried sample is obtained; and annealing the dried sample.

10. A composition for inducing a two-electron oxidation reduction reaction ($2e^-$ ORR) to produce hydrogen peroxide, the composition comprising:

a nanostructured carbon substrate having oxidation defects induced therein; and noble metal clusters trapped within the oxidation defects via solution impregnation in an acid solution, wherein the noble metal clusters are partially oxidized;

wherein the composition induces a selective 2-electron oxygen reduction reaction in an acidic electrolyte to produce hydrogen peroxide.

11. The composition of claim 10, wherein the oxidation defects comprise C—C, C—O, C=O functional groups.

12. The composition of claim 11, wherein the noble metal clusters are one or a combination of $Pd_3$ and $Pd_4$.

13. The composition of claim 10, wherein the noble metal clusters are at least partially amorphous.

14. The composition of claim 10, wherein the acidic electrolyte is $HClO_4$, $HNO_3$, or $H_2SO_4$.

15. A two-electron ($2e^-$) oxidation reduction reaction (ORR) electrocatalyst for inducing production of hydrogen peroxide in an acidic electrolyte, the electrocatalyst comprising:

partially oxidized palladium (Pd) clusters; and an oxygen-functionalized carbon nanotube (CNT) substrate, wherein a synergistic interaction is formed between the clusters and the CNT substrate using acid solution impregnation.

16. The electrocatalyst of claim 15, wherein the Pd clusters comprises one or a combination of $Pd_3$ clusters and $Pd_4$ clusters.

17. The electrocatalyst of claim 15, wherein the Pd clusters are partially amorphous.

18. The electrocatalyst of claim 15, wherein the Pd clusters have coordination numbers of Pd—Pd and Pd—O of 2.5 and 2.7, respectively.

19. The electrocatalyst of claim 15, wherein the acidic electrolyte is $HClO_4$, $HNO_3$, or $H_2SO_4$.

* * * * *